US008876602B2

(12) United States Patent
Katagiri

(10) Patent No.: US 8,876,602 B2
(45) Date of Patent: Nov. 4, 2014

(54) GAME MACHINE, AND CONTROL METHOD AND STORAGE MEDIUM STORING COMPUTER PROGRAM USED THEREFOR

(75) Inventor: Shota Katagiri, Minato-ku (JP)

(73) Assignee: Konami Digital Entertainment Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 14/001,385

(22) PCT Filed: Feb. 14, 2012

(86) PCT No.: PCT/JP2012/053390
§ 371 (c)(1),
(2), (4) Date: Aug. 23, 2013

(87) PCT Pub. No.: WO2012/117848
PCT Pub. Date: Sep. 7, 2012

(65) Prior Publication Data
US 2013/0331186 A1   Dec. 12, 2013

(30) Foreign Application Priority Data

Mar. 1, 2011   (JP) .................................. 2011-044368

(51) Int. Cl.
*G07F 17/32*   (2006.01)
*A63F 13/30*   (2014.01)
*A63F 13/00*   (2014.01)

(52) U.S. Cl.
CPC ........... *A63F 13/00* (2013.01); *A63F 2300/638* (2013.01); *A63F 13/12* (2013.01); *A63F 2300/646* (2013.01); *A63F 2300/407* (2013.01); *A63F 2300/534* (2013.01); *A63F 2300/8011* (2013.01)
USPC .................................. 463/31; 463/30; 463/42

(58) Field of Classification Search
USPC ................................................ 463/30, 31, 42
See application file for complete search history.

(56) References Cited

U.S. PATENT DOCUMENTS

2006/0009979 A1   1/2006   McHale et al.
2008/0113698 A1   5/2008   Egozy
(Continued)

FOREIGN PATENT DOCUMENTS

JP   2000-155543 A   6/2000
JP   2003-236243 A   8/2003
(Continued)

OTHER PUBLICATIONS

Korean Office Action with English Translation—Mailing Date Sep. 25, 2013.

(Continued)

*Primary Examiner* — Pierre E Elisca
(74) *Attorney, Agent, or Firm* — Howard & Howard Attorneys PLLC

(57) ABSTRACT

Improved is the control of travel speed of operation indication marker in the case that the case that the delay in detection of operation time occurs. The game machine makes the object (60) pump between the reference portions (55A, 55B) corresponding to the operation portions of online opponent players, and makes the player of the own game machine perform the operation portion at the time when the object (60) reaches the reference portion (55A). The game machine determines whether the detection delay of operation time occurs. When the delay occurs, the game machine estimates as the original distance, the distance from the object (60) to the next arrival position (R1b) assuming that the delay did not occur (the distance on the path R2-CR1b), and the display of the object (60) is corrected so that the difference between the original distance estimated and the actual distance from the object (60) to the next arrival position (the distance on the path A, C, R1b) is eliminated earlier than the operation time corresponding to the next arrival position (R1b).

11 Claims, 15 Drawing Sheets

(56) References Cited

U.S. PATENT DOCUMENTS

| | | |
|---|---|---|
| 2010/0067578 A1* | 3/2010 | Nakagawa ............... 375/240.13 |
| 2011/0034247 A1 | 2/2011 | Masuda et al. |
| 2011/0124385 A1 | 5/2011 | Otomo et al. |
| 2013/0040733 A1 | 2/2013 | Yamamoto et al. |
| 2013/0079137 A1 | 3/2013 | Yamamoto et al. |

FOREIGN PATENT DOCUMENTS

| | | |
|---|---|---|
| JP | 2011-30872 A | 2/2011 |
| JP | 4827982 B1 | 11/2011 |
| KR | 10-2010-0087769 | 8/2010 |
| WO | 2011/136303 A1 | 11/2011 |

OTHER PUBLICATIONS

International Search Report—Date of Mailing May 22, 2012.
Japanese Office Action with English Translation—Dispatch Date May 15, 2012.
Chinese Office Action with English Translation—Date of Issue Feb. 24, 2014.

* cited by examiner

GAME MACHINE, AND CONTROL METHOD AND STORAGE MEDIUM STORING COMPUTER PROGRAM USED THEREFOR

CROSS REFERENCE TO RELATED APPLICATION

This application is a national stage application of PCT/JP2012/053390, filed Feb. 14, 2012, which claims priority to Japanese Patent Application No. 2011-044368, Mar. 1, 2011, the disclosures of which are hereby incorporated by reference in their entirety.

TECHNICAL FIELD

The present invention relates to a game machine indicating an operation time of an operation portion provided in an input device to a player, and a control method and a storage medium storing a computer program used for the game machine.

BACKGROUND ART

There is a game machine that allows a plurality of players to alternately operate an operation portion in accordance with the rhythm of music. As such a game machine, there is known a game machine that is played by a plurality of players and allows the players to alternately operate an operation portion while determining the player who should operate the operation portion next by the operation to the operation portion (see, for example, Patent Literature 1). Also, there is known a game machine that is played in such a manner that two players alternately hit back a target object indicating an operation time and the speed of the target object traveling toward an opponent side changes depending on the position of the target object at the moment when the player hits back the target object (see, for example, Patent Literature 2).

Patent Literature 1: JP 2003-236243 A and Patent Literature 2: JP 2000-155543 A.

SUMMARY OF INVENTION

Technical Problem

When a plurality of players play a game of the above-described type by game machines that are connected to each other through a communication line, it is necessary that each game machine progresses the game by receiving operation information from the game machine of the opponent player and detecting an operation time of the opponent player from the received operation information. In this case, in a case that the detection of the operation time of the opponent player is delayed due to the congestion of the communication line or the like, the turn time of the travel direction of an operation indication marker such as the target object may be delayed even when the opponent player performs an operation at an appropriate time. The next operation time to be indicated by the operation indication marker is predetermined. While, when the change of the travel direction of the operation indication marker is delayed, the distance which the operation indication marker should travel next increases and the remaining time up to the next operation time decreases. Therefore, since it becomes necessary that the operation indication marker is made to travel at a higher speed than the original, an unintended problem may arise in the control result of the travel speed.

Therefore, an object of the present invention is to provide a game machine that improves the control of the travel speed of the operation indication marker when the detection of the operation time is delayed.

Solution to Problem

A game machine according to one aspect of the present invention is a game machine being applied to a game system progressing a game between a plurality of terminals connected through a communication line, and functioning as one of the plurality of terminals, the game machine including: an input device including at least one operation portion; a display device for displaying a game screen; a sequence data storage unit for storing sequence data that describes operation time of the operation portion of an own game machine during the game and operation time of the operation portion of another game machine functioning as another terminal of the game system; a game region presenting unit adapted and configured to display a game region, in which a reference portion corresponding to the operation portion of the own game machine and a reference portion corresponding to the another game machine are disposed to be spaced apart from each other by a predetermined distance, on the game screen; an own game machine operation detecting unit adapted and configured to detect operation information having an actual operation time to the operation portion of the own game machine; an operation information transmitting unit which adapted and configured to transmit the operation information detected by the own game machine operation detecting unit to the another game machine; an another game machine operation detecting unit adapted and configured to detect an actual operation time to the operation portion of the another game machine based on the operation information transmitted from an operation information transmitting unit of the another game machine; and a marker display control unit adapted and configured to move an operation indication marker indicating the operation time within the game region such that the operation indication marker arrives at the reference portion corresponding to the operation portion of the own game machine at the operation time of the operation portion of the own game machine described in the sequence data and arrives at the reference portion of the another game machine at the operation time of the operation portion of the another game machine, and plus, a travel path of the operation indication marker changes into a travel path headed to a next reference portion in response to the detection of the operation time by the own game machine operation detecting unit and the another game machine operation detecting unit, and further the marker display control unit includes: a delay determining unit adapted and configured to determine whether or not a delay occurs in a moment when the operation time is detected by the operation detecting unit with respect to the actual operation time recorded in the operation information; and a correction unit adapted and configured to estimate a distance from the operation indication marker to the next reference portion as an original distance on the assumption that the delay has not occurred, when it is determined that the delay occurs, and correct display of the operation indication marker such that a difference between the original distance estimated and an actual distance from the operation indication marker to the next reference portion is eliminated earlier than the operation time on the sequence data corresponding to the next reference portion.

A computer program of a game machine which a non-transitory computer-readable storage medium according to one aspect of the present invention stores is a computer program of a game machine, the game machine being applied to a game system progressing a game between a plurality of terminals connected through a communication line, functioning as one of the plurality of terminals, and including: an input device including at least one operation portion; a display device for displaying a game screen; and a sequence data storage unit for storing sequence data that describes operation time of the operation portion of an own game machine during the game and operation time of the operation portion of another game machine functioning as other terminal of the game system, the computer program being configured to make a computer of the game machine function as: a game region presenting unit adapted and configured to display a game region, in which a reference portion corresponding to the operation portion of the own game machine and a reference portion corresponding to the another game machine are disposed to be spaced apart from each other by a predetermined distance, on the game screen; an own game machine operation detecting unit adapted and configured to detect operation information having an actual operation time to the operation portion of the own game machine; an operation information transmitting unit adapted and configured to transmit the operation information detected by the own game machine operation detecting unit to the another game machine; an another game machine operation detecting unit adapted and configured to detect an actual operation time to the operation portion of the another game machine based on the operation information transmitted from an operation information transmitting unit of the another game machine; and a marker display control unit adapted and configured to move an operation indication marker indicating the operation time within the game region such that the operation indication marker arrives at the reference portion corresponding to the operation portion of the own game machine at the operation time of the operation portion of the own game machine described in the sequence data and arrives at the reference portion of the another game machine at the operation time of the operation portion of the another game machine, and plus, a travel path of the operation indication marker changes into a travel path headed to a next reference portion in response to a detection of the operation time by the own game machine operation detecting unit and the another game machine operation detecting unit, and further the marker display control unit includes: a delay determining unit adapted and configured to determine whether or not a delay occurs in a moment when the operation time is detected by the operation detecting unit with respect to the actual operation time recorded in the operation information; and a correction unit adapted and configured to estimate a distance from the operation indication marker to the next reference portion as an original distance on the assumption that the delay has not occurred, when it is determined that the delay occurs, and correct display of the operation indication marker such that a difference between the original distance estimated and an actual distance from the operation indication marker to the next reference portion is eliminated earlier than the operation time on the sequence data corresponding to the next reference portion.

A method for controlling a game machine according to one aspect of the present invention is a method for controlling a game machine which is applied to a game system progressing a game between a plurality of terminals connected through a communication line, and functions as one of the plurality of terminals, the game machine including: an input device including at least one operation portion; a display device for displaying a game screen; and a sequence data storage unit for storing sequence data that describes operation time of the operation portion of an own game machine during the game and operation time of the operation portion of another game machine functioning as other terminal of the game system, the method making a computer of the game machine execute the following steps: a game region presenting step for displaying a game region, in which a reference portion corresponding to the operation portion of the own game machine and a reference portion corresponding to the another game machine are disposed to be spaced apart from each other by a predetermined distance, on the game screen; an own game machine operation detecting step for detecting operation information having an actual operation time to the operation portion of the own game machine; an operation information transmitting step for transmitting the operation information detected by the own game machine operation detecting step to the another game machine; an another game machine operation detecting step for detecting an actual operation time to the operation portion of the another game machine based on the operation information transmitted by an operation information transmitting step of the another game machine; and a marker display control step for moving an operation indication marker indicating the operation time within the game region such that the operation indication marker arrives at the reference portion corresponding to the operation portion of the own game machine at the operation time of the operation portion of the own game machine described in the sequence data and arrives at the reference portion of the another game machine at the operation time of the operation portion of the another game machine, and plus, a travel path of the operation indication marker changes into a travel path headed to a next reference portion in response to a detection of the operation time by the own game machine operation detecting step and the another game machine operation detecting step, and further the marker display control step includes: a delay determining step for determining whether or not a delay occurs in a moment when the operation time is detected by the operation detecting step with respect to the actual operation time recorded in the operation information; and a correction step for estimating a distance from the operation indication marker to the next reference portion as an original distance on the assumption that the delay has not occurred, when it is determined that the delay occurs, and correcting display of the operation indication marker such that a difference between the original distance estimated and an actual distance from the operation indication marker to the next reference portion is eliminated earlier than the operation time on the sequence data corresponding to the next reference portion.

According to the present invention, it is determined whether a delay occurs in the detection of the operation time. When the delay occurs, the distance from the operation indication marker to the next reference portion on the assumption that the delay has not occurred is estimated as an original distance, and the display of the display indication marker is corrected such that the difference between the original distance and the actual distance from the operation indication marker to the next reference portion is eliminated earlier than the operation time on the sequence data corresponding to the next reference portion, that is, the time at which the operation indication marker should arrive at the next reference potion. Thus, after elimination of the difference in distance, by moving the operation indication marker at the same speed as in the case of no delay, the operation indication marker can be made to arrive at the next reference portion at the correct operation time described in the sequence data. Accordingly, the control of the travel speed of the operation indication marker in the case of occurrence of a delay in the detection of the operation time is improved.

In an embodiment of the present invention, the correction for eliminating the difference in distance may be performed in an appropriate mode depending on the situation. As on example, when the marker display unit moves the operation indication marker within the game region by gradually changing a position of the operation indication marker in accordance with a cycle for drawing the game screen, the correction unit may be adapted and configured to change the position of the operation indication marker in a next cycle of drawing relatively to the position of the operation indication marker in one cycle of drawing such that the distance difference is eliminated at one time. In this case, the operation indication marker can be instantaneously moved to eliminate the distance difference, and after that, the operation indication marker can be moved toward the next reference portion at the same speed as in the case of no delay.

Alternatively, when it is determined that the delay occurs, the correction unit may be adapted and configured to eliminate the difference in distance by setting the new travel path from a position of the operation indication marker at a moment when the operation time is detected and starting a movement of the operation indication marker along the new travel path toward the next reference portion from a position on the new travel path, at which a distance to the next reference portion is equal to the original distance estimated. In this case, when it is determined that the delay has occurred, the difference in distance is immediately eliminated, and after that, the operation indication marker can be moved toward the next reference portion at the same speed as in the case of no delay.

When the marker display unit moves the operation indication marker within the game region by gradually changing a position of the operation indication marker in accordance with a cycle for drawing the game screen, the correction unit may be adapted and configured to change the position of the operation indication marker in a next cycle of drawing relatively to the position of the operation indication marker in one cycle of drawing of the game screen such that the difference in distance is reduced gradually through a plurality of times of drawing the game screen. In this case, after the movement of operation indication marker is started along the new travel path, the operation indication marker is moved such that the difference in distance is gradually reduced in a relatively early stage. After the difference in distance is eliminated, the operation indication marker can be moved toward the next reference portion at the same speed as in the case of no delay.

Alternatively, when it is determined that the delay occurs, the correction unit may be adapted and configured to eliminate the difference in distance, by setting the new travel path from a position of the operation indication marker at a moment when the operation time is detected, repeatedly estimating the original distance while the operation indication marker moving, and increasing a travel speed of the operation indication marker with respect to an original travel speed, which is determined according to the original distance and remaining time until the operation time on the sequence data corresponding to the next reference portion, until a distance from the operation indication marker to the next reference portion on the new travel path is equal to the original distance. In this case, after the movement of operation indication marker is started along the new travel path, the operation indication marker is accelerated until the difference in distance is eliminated. After the difference in distance is eliminated, the operation indication marker can be moved toward the next reference portion at the same speed as in the case of no delay.

In an embodiment of the present invention, the marker display control unit may be adapted and configured to change the travel path when the actual operation time is within a predetermined range with respect to the operation time described in the sequence data, and may be adapted and configured to set a shortest path toward the next reference portion as the new path when a predetermined time has lapsed in a state where the actual operation time is not detected. The correction unit may be adapted and configured to correct the display for eliminating the difference in distance at a moment only before the operation indication marker starts moving along the shortest path, and may be adapted and configured not to correct the display after the operation indication marker starts moving along the shortest path. When the operation indication marker starts moving along the shortest path, the operation indication marker moves at a relatively low speed. Thus, when the correction of display for eliminating the difference in distance is executed only in the above mentioned case, the operational effects of the present invention can be sufficiently exerted.

The present invention can be applied to various embodiments of game machines. For example, the game region presenting unit may be adapted and configured to display as the game region on the screen of the display device, a region being formed in a quadrangle shape in which two of the reference portions formed in a linear shape are set at both ends of the quadrangle respectively so as to face each other. The input device may include a touch panel that is disposed in the display device to cover the game region. In addition, the game machine of the present invention may further include an audio output device for reproducing and outputting sounds, a tune data storage for storing tune data for reproducing a tune, and a tune reproducing unit which is adapted and configured to reproduce the tune from the audio output device based on the tune data, wherein the sequence data may describe the operation time of the operation portion during a reproduction of the tune.

Advantageous Effects of Invention

As described above, according to the present invention, the display of the operation indication marker is corrected such that the difference between the original distance from the operation indication marker to the next reference portion and the actual distance from the operation indication marker to the next reference portion, the difference being caused by the occurrence of a delay in the detection of the operation time, is eliminated earlier than the operation time on the sequence data corresponding to the next reference portion. Thus, after elimination of the difference in distance, by moving the operation indication marker at the same speed as in the case of no delay, the operation indication marker can be made to arrive at the next reference portion at the correct operation time described in the sequence data. Accordingly, the control of the travel speed of the operation indication marker in the case of occurrence of a delay in the detection of the operation time is improved.

DESCRIPTION OF EMBODIMENTS

Figure 1:
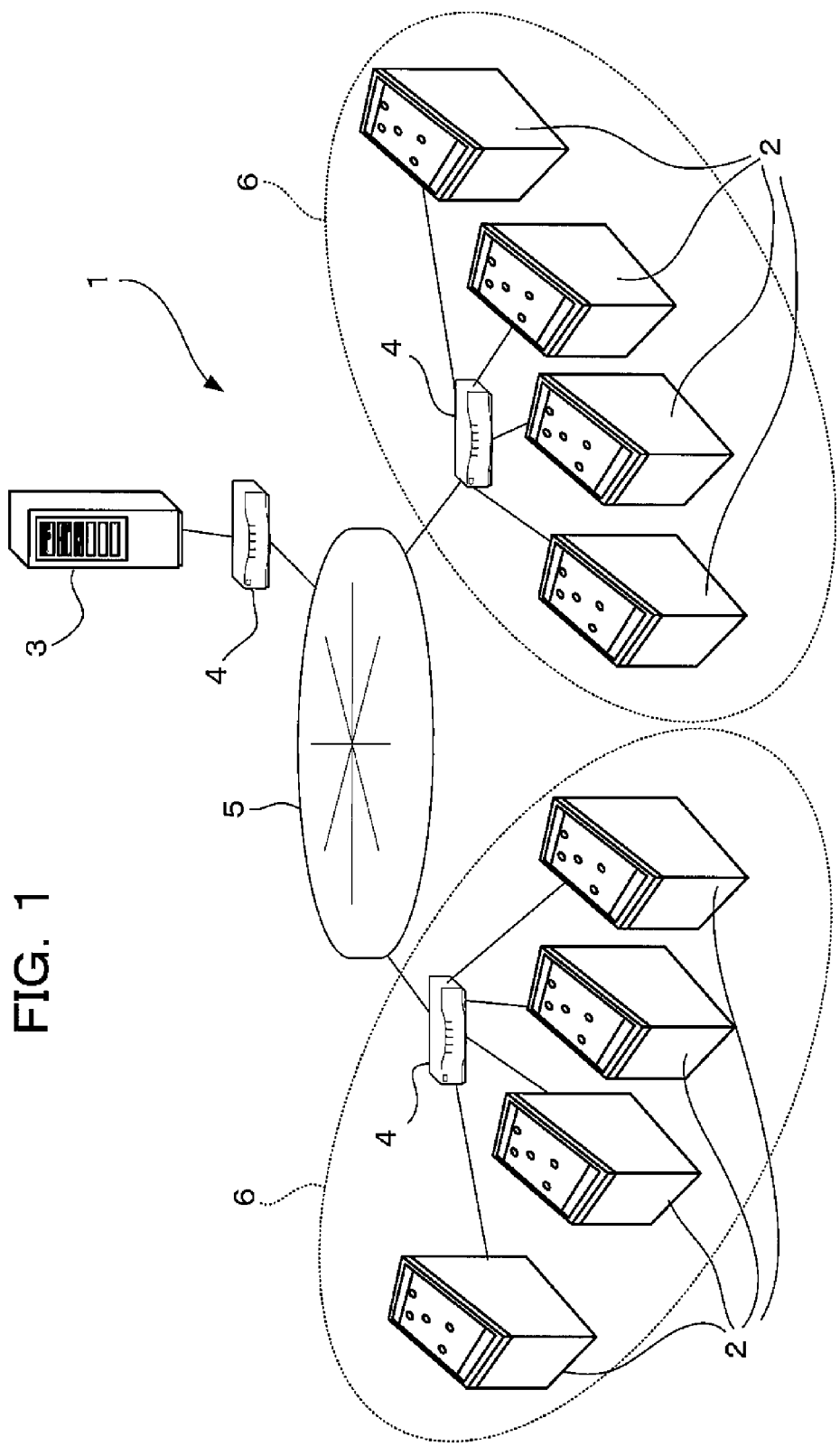
FIG. 1 is a diagram illustrating a game system including game machines according to an embodiment of the present invention.

FIG. 1 illustrates a game system including game machines according to an embodiment of the present invention. In a game system 1, a plurality of game machines 2 and a center server 3 are connected through a router 4 to a network 5 respectively. The center server 3 is not always configured by one physical device, and one logical center server 3 may be configured by a server group as a plurality of physical devices. Each of the game machine 2 is connected to the network 5 to function as a terminal device (or a client) of the game system 1. The Internet is used as the network 5. Incidentally, the network 5 is not always the Internet, but may be any network using a communication line.

Each game machine 2 is configured as a game machine for business use that allows a predetermined range of game-play in exchange for payment of a game-play fee. An appropriate number of game machines 2 are installed in each commercial facility such as a store 6. The routers 4 are installed in association with the stores 6 and the center server 3 respectively. The game machines 2 in the same store are connected through the common router 4 to the network 5. Incidentally, a local server may be installed between the game machine 2 and the router 4 such that the game machine 2 is communicatively connected through the local server to the center server 3.

The center server 3 includes a control unit (not illustrated) configured as a computer that includes a microprocessor, and an internal storage device (not illustrated) such as a ROM where recorded is a program such as an operating system to be executed by the microprocessor, and a RAM providing a work area for the microprocessor. Also, the center server 3 is connected to an external storage device not illustrated. The external storage device stores various kinds of server programs to be executed in the control unit, and various kinds of data referred to by the server programs.

Figure 2:
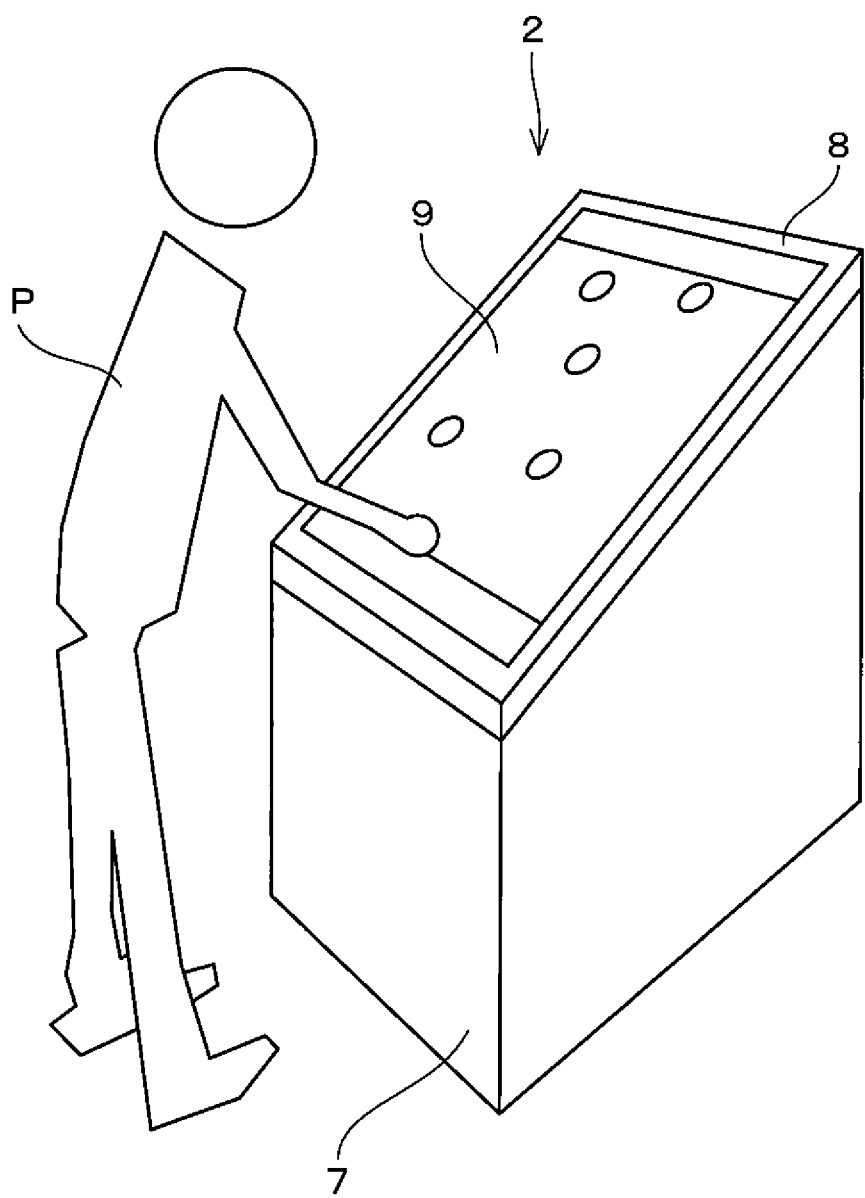
FIG. 2 is a diagram illustrating a physical configuration of a game machine in the game system.

FIG. 2 illustrates a physical configuration of the game machine 2. The game machine 2 includes a housing 7 and a monitor 8 as a display device that is disposed on a top surface of the housing 7 being inclined to the player P side. A transparent touch panel 9 is superimposed on the surface of the monitor 8. The touch panel 9 is a publicly-known input device that, when the player P touches a point in the touch panel 9 with a finger or the like, outputs a signal corresponding to the point touched. In addition, the game machine 2 includes a variety of input devices and output devices included in a general game machine for business use, such as a button for selection or determination, a power supply switch, a volume control switch, and a power supply lamp, but the illustration thereof is omitted in FIG. 2.

Figure 3:
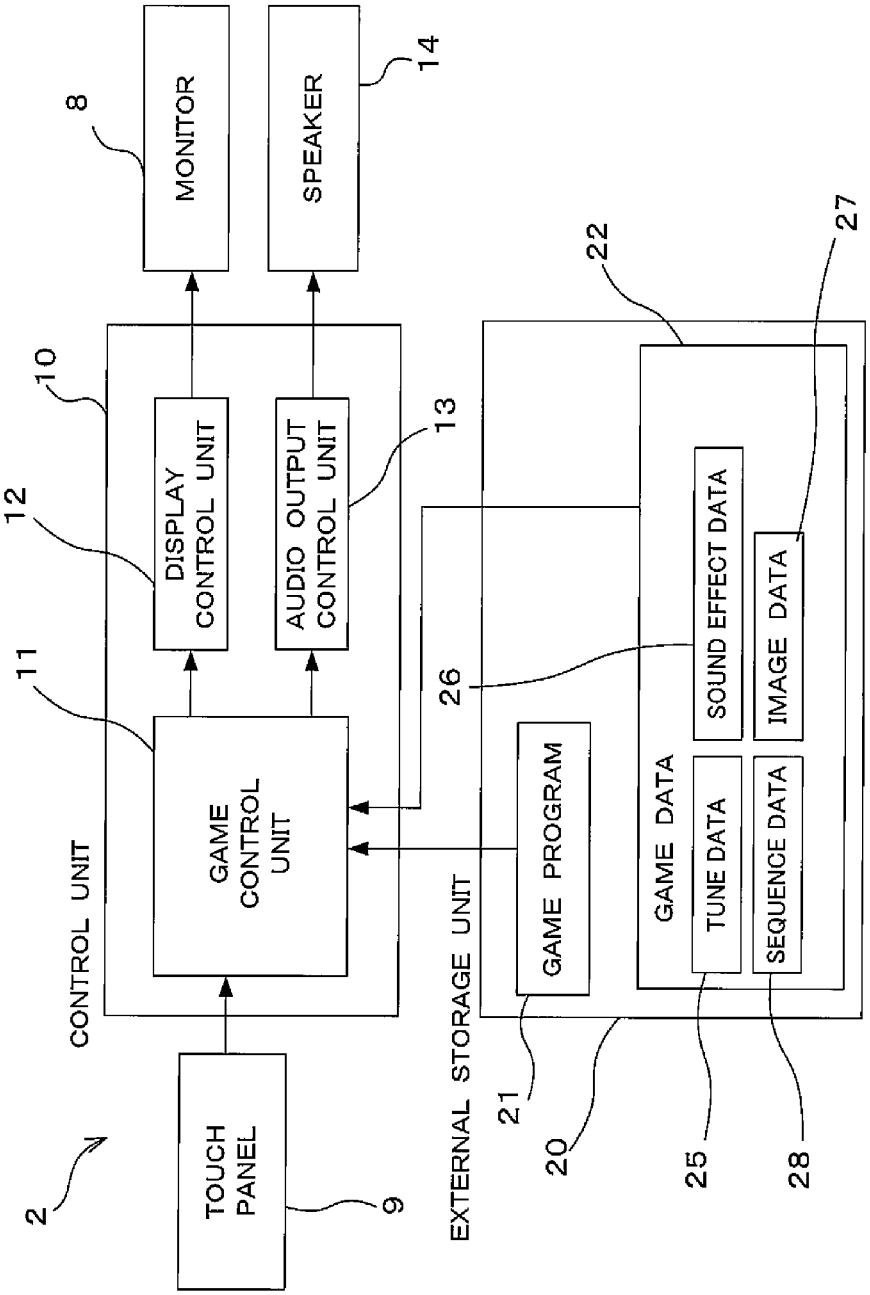
FIG. 3 is a functional block diagram of the game machine.

FIG. 3 is a functional block diagram of the game machine 2. A control unit 10 is provided as a computer inside the housing 7. The control unit 10 includes a game control unit 11 as a main controller, and a display control unit 12 and audio output control unit 13 which operates according to output from the game control unit 11. The game control unit 11 is configured as a unit by combination of a microprocessor and various peripheral devices such as an internal storage device (for example, a ROM and a RAM) necessary for operation of the microprocessor. The display control unit 12 draws an image corresponding to image data received from the game control unit 11 in a frame buffer and outputs a video signal corresponding to the drawn image to the monitor 8, in order to display a predetermined image on the monitor 8. The audio output control unit 13 generates an audio reproduction signal corresponding to audio reproduction data received from the game control unit 11 and outputs the generated audio reproduction signal to a speaker 14 as an audio output device connected to the control unit 10, in order to reproduce a predetermined sound (including a music sound) from the speaker 14.

An external storage device 20 is connected to the game control unit 11. The external storage device 20 uses a storage medium capable of maintaining storage even without power supply, including an optical storage medium such as a DVDROM or a CDROM and a nonvolatile semiconductor memory device such as an EEPROM.

The external storage device 20 stores a game program 21 and game data 22. The game program 21 is a computer program that is necessary to execute a music game in the game machine 2 according to a predetermined procedure. When the game machine 2 is activated, the game control unit 11 executes various kinds of initial settings necessary for operation as the game machine 2 by executing an operation program stored in the internal storage device, and then sets an environment for executing a music game according to the game program 21 by reading the game program 21 from the external storage device 20 and executing the game program 21. The game control unit 11 is a logical device that is realized by a combination of computer hardware and the computer program. The game control unit 11 executes such music game processing as indicating an operation to the player in accordance with the reproduction of music (a tune) selected by the player, or generating a sound effect according to an operation of the player. In addition, the game control unit 11 also performs such processing as evaluating an operation of the player and controlling a game according to the evaluation result.

The game data 22 include various kinds of data that are to be referred to when executing a music game according to the game program 21. The game data 22 include tune data 25, sound effect data 26, and image data 27. The tune data 25 is data necessary to reproduce and output a tune for a game from the speaker 14. Although FIG. 3 illustrates one kind of tune data 25, the player can actually select a tune for game-play from a plurality of kinds of tunes. In the game data 22, a plurality of kinds of tunes data 25 corresponding respectively to the plurality of kinds of tunes are recorded with information for identification of each tune. By storing the tune data 25, the external storage device 20 functions as a tune data storage unit.

The sound effect data 26 is data where a plurality of kinds of sound effects to be output from the speaker 14 in response to operations of the player, are recorded in association with codes each of which is unique for each sound effect. The sound effects include various kinds of sounds such as musical instruments and the like. For each kind of sound effect, sound effect data having different octaves and pitches may be prepared. The image data 27 is data for displaying a background image inside a game screen, various kinds of objects, icons, and the like on the monitor 8. The game data 22 further include sequence data 28. The sequence data 28 is data indicating an operation time to the player, the details of which will be described below. By storing the sequence data 28, the external storage device 20 functions as a sequence data storage unit.

Next, the outline of music game executed in the game machine 2 will be described. The game machine 2 can execute a battle-type music game that allows a player of an own game machine 2 and a player of another game machine (the other game machine) 2 connected through the network 5 to perform operations in accordance with the same music, evaluates the operations of the players, and allows the players to compete for the evaluation results.

Before the game is started, a matching request for finding an opponent is transmitted from each game machine 2 through the network 5 to the center server 3. Based on the matching request from each game machine 2, the center server 3 combines two players who become opponents against each other. When the opponents are determined based on the designation of the center server 3, the music game based on communication between the game machines 2 is started between the players.

Figure 4:
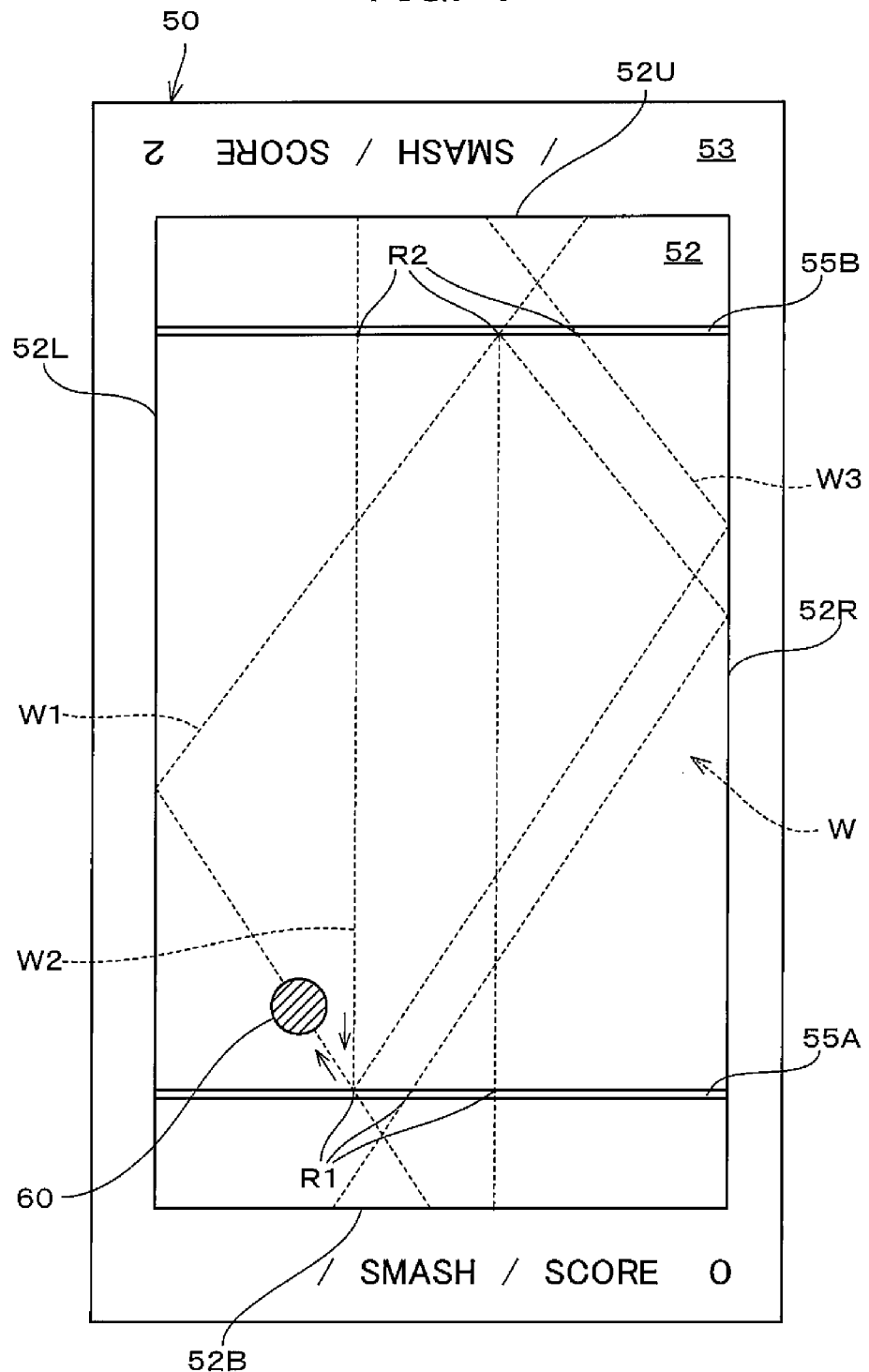
FIG. 4 is a diagram schematically illustrating a game screen.

FIG. 4 is a diagram schematically illustrating a game screen of a music game executed in the game machine 2. A game screen 50 includes a game region 52 for notifying the player of an operation time, and an information region 53 for displaying game information including scores of the combined two players. The game region 52 is formed in a rectangular shape. In the vicinity of each of the ends 52U and 52B in the longitudinal direction of the game region 52 (the vertical direction of FIG. 4), a first reference portion 55A and a second reference portion 55B as a reference portion are disposed so as to face each other. Each of the reference portions 55A and 55B extends linearly in the direction perpendicular to the longitudinal direction of the game region 52. By displaying the game region 52 on the monitor 8, the game control unit 11 functions as a game region presenting unit.

The reference portion 55A is used as a current-time reference on the game by each of the players that operate the combined two game machines 2. On the other hand, the reference portion 55B functions as a marker for indicating a current-time reference of the opponent player. That is, the first reference portion 55A functions as a current time reference of the player operating the game machine (the player may be hereinafter referred to as a first player), and the second reference portion 55B functions as a marker for indicating a position that is recognized as a current time reference by the player operating the other game (the player may be hereinafter referred to as a second player). Incidentally, the game screen 50 of FIG. 4 is illustrated so that the front side viewed from the first player is disposed downward and the back side viewed from the first player is disposed upward. Each of the reference portions 55A and 55B has different color for discriminating each player. In the example of FIG. 4, a red straight line is used as the first reference portion 55A, and a blue straight line is used as the second reference portion 55B. Also, the information region 53 is disposed around the game region 52. One end side of the information region 53 in the longitudinal direction of the game region 52 is used to display the score and the like of one-side player, and the other end side of the information region 53 is used to display the score and the like of the other-side player.

The reference portions 55A and 55B include a plurality of rebound points R1 and R2 respectively. As represented by broken lines in FIG. 4, each of the plurality of rebound points R1 included in the first reference portion 55A and each of the plurality of rebound points R2 included in the second reference portion 55B are connected to each other by a plurality of paths W. Specifically, there are a plurality of paths W extending from one rebound point R1 of the first reference portion 55A to a plurality of rebound points R2 included in the second reference portion 55B. Likewise, there are a plurality of paths W extending from one rebound point R2 of the second reference portion 55b to a plurality of rebound points R1 included in the first reference portion 55A. Incidentally, FIG. 4 illustrates only a part of the rebound points R1 and R2. Actually, the plurality of rebound points R1 and R2 are arranged along the reference portions 55A and 55B at predetermined intervals.

The plurality of paths W extending from the rebound points R1 of the first reference portion 55A extend through the rebound points R2 to an upper end portion 52U of the second reference portion 55B. Also, the plurality of paths W extending from the rebound points R2 of the second reference portion 55B extend through the rebound points R1 to a bottom end portion 52B of the first reference portion 55A. As for one rebound point R1 of the first reference portion 55A, as a plurality of paths for the rebound point R1, three paths W1, W2 and W3 extend from this rebound point R1 to three rebound points R2 included in the second reference portion 55B. During the execution of the music game, that is, in reproduction of a tune, on the path W connecting the rebound point R1 and the rebound point R2, an object 60 as an operation indication marker is displayed in accordance with the sequence data 28. Incidentally, although each of the paths W1, W2 and W3 is represented by a broken line in FIG. 4 for the convenience of description, any one of the plurality of paths W is not displayed on an actual game screen 50A.

The object 60 appears at the rebound point R1 or the rebound point R2 at a predetermined time during the tune. According to the progress of the tune, the object 60 moves from the rebound point R1 or R2 where the object 60 appears toward the rebound point R2 or R1 of the opposite side along the path W extending from the rebound point R1 or R2 where the object 60 appears. In a case that an appropriate operation is executed so as to be coincident with the arrival of the object 60 at the reference portion 55A or 55B, the object 60 disappears. In exchange for the disappearance of the object 60, a next object 60 appears at the rebound point R1 or R2 of the reference portion 55A or 55B. That is, when the appropriate operation is executed, the position (the rebound point) where the object 60 arrived functions as an appearance position of the next object 60. Incidentally, the object 60 moves along any one of the plurality of paths W set with respect to one rebound point R1 (or R2). The processing of selecting one path W from the plurality of paths W will be described later.

The object 60 which appeared at the appearance position moves from the appearance position toward each of the rebound points R1 or R2 located on the opposite side. Therefore, in a case that the appropriate operation is executed, the object 60 moves repeatedly between the reference portions 55A and 55B alternately as if the object 60 rebounds from the rebound point R1 and R2. On the other hand, in a case that an appropriate operation is not executed, the object 60 passes through the reference portion 55A or 55B along the path W. After passing through the reference portion 55A or 55B, the object 60 moves to the upper end portion 52U or the bottom end portion 52B. The position where the object 60 has arrived in each end portion 52U or 52B functions as the appearance position of the next object 60. Therefore, in a case that an operation has not been executed, the object 60 changes the travel direction to move from the end portion 52U or 52B toward the opposite reference portion, as if the object 60 rebounds from the end portion 52U or 52B. After rebounding from the end portion 52U or 52B, the traveling path of the object 60 is set to a path having the minimum distance to the rebound point to be reached next without passing through sidewalls 52L and 52R. Incidentally, the inversion of the object 60 is a principle, and an exceptional processing may be executed in some cases. Details will be described later.

As the above-described appropriate operation, each player is required to perform a touch operation to touch a position in the reference portion 55A where the object 60 has arrived coincidently with the arrival of the object 60 of the own game machine at the reference portion 55A. When each player performs the touch operation, gap time between the time the object 60 has arrived at the reference portion 55A and the time each player has performed the touch operation is detected. When the gap time is smaller, the evaluation for the operation of the player becomes higher. In addition, a sound effect is reproduced from the speaker 14 in response to the touch operation. The sound effect may be reproduced by a well-known method. For example, as the well-known method of sound effect reproduction, there is such a method as a sound effect is added over the tune which is being reproduced, or, in a case that miss-operation has been performed, a sound effect for the miss-operation is reproduced while muting the tune. In addition, there is another example of the well-known sound effect reproduction method, in which a tune is divided into some parts and each part is allocated to each operation time, and in a case the appropriate operation is performed, the part of tune which is allocated to the corresponding operation time is reproduced (such a method as a tune is formed by appropriate operations at the respective operation times. Therefore, in the case of a miss-operation, the part of tune allocated to the operation time is not reproduced).

In the example of FIG. 4, the object 60 is moving toward the rebound point R2 of the second reference portion 55B along the path W1. So as to be coincident with the arrival of the object 60 at the second reference portion 55B, the second player may touch the arrival position of the object 60 in the first reference portion 55A displayed on the game screen 50 of the other game machine (the own game machine when viewed from the second player). The object 60 is displayed in a color corresponding to the reference portion 55A or 55B where the object 60 is going to arrive. That is, in the example of FIG. 4, the object 60 is displayed in a blue color until arriving at the rebound point R2 of the second reference portion 55B, and the next object 60 to appear at the rebound point R2 where the object 60 has arrived is displayed in a red color. In the present embodiment, an operation portion is formed by a combination of the reference portion 55A on the monitor 8 (specifically, all the rebound points R1 set on the reference portion 55A) and the touch panel 9 superimposed on the reference portion 55A. That is, the reference portion 55A functions as a part of the operation portion in the input device of the present invention, and functions as the reference portion corresponding to the own operation portion. Incidentally, hereinafter, the reference portion 55A may be used as a representative term of the operation portion. The reference portion 55B is the reference portion corresponding to the operation portion of the game machine 2 of the opponent player (the other game machine).

Figure 5:
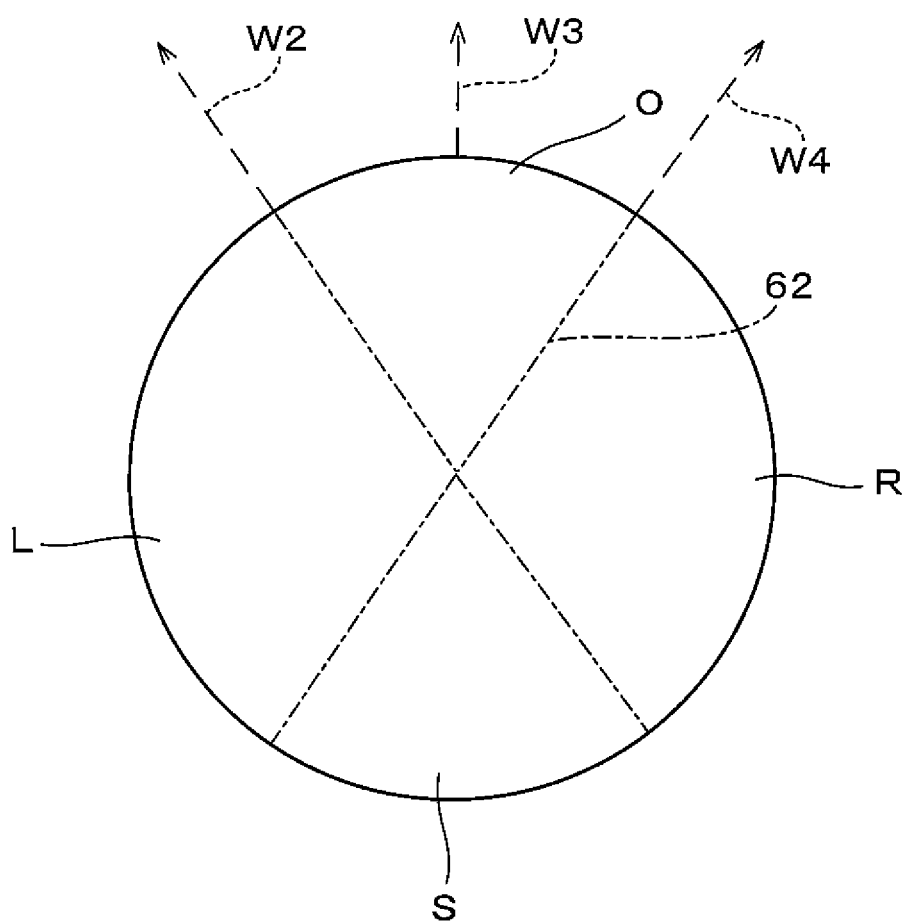
FIG. 5 is a diagram for describing the relation between an operation position of an object and a selection of a travel path thereof.

The selection of the path W along which the object 60 moves is determined based on the position of the object 60 at the moment when the reference portion 55A is touched. For easy comparison of the positions, the object 60 is divided into a plurality of regions. FIG. 5 is a diagram for describing the regions of the object 60. In FIG. 5, broken lines respectively represent the paths W1, W2 and W3, and chain lines 62 respectively represent the boundaries between the regions.

In the example of FIG. 5, the object 60 is divided into four regions: a contact region S in the vicinity of a contact point where the object 60 contacts first the reference portion 55A, a right side region R and a left side region L the boundary of which is the contact region S, and other region O. The path W along which the object 60 should move next is selected depending on which region is touched by the player. That is, when the vicinity of the contact region S or the other region O (including each region itself) is touched, the straight path W2 providing the minimum distance to the rebound point R1 is selected. When the vicinity of the left side region L (including the left side region itself) is touched, the first right side path W3 extending toward the rebound point R1 through the right sidewall 52R in the longitudinal direction of the game region 52 is selected. When the vicinity of the right side region R (including the right side region) is touched, the first left side path W1 extending toward the rebound point R1 through the left sidewall 52L in the longitudinal direction of the game region 52 is selected. The travel paths W1 to W3 have different lengths from each other. Thus, the travel distance of the object 60 to the next reference portion 55A or 55B is different depending on the positional relation between the operation position and the position of the object 60. On the other hand, the operation time to touch the object 60, that is, the time when the object 60 should arrive at the reference portion 55A or 55B is equal regardless of the length of the travel path W. Therefore, the travel speed of the object 60 is different depending on the travel path. That is, the path W and the travel speed of the object 60 moving toward the other-side player vary depending on the touch operation of the one-side player. Accordingly, since the degree of difficulty of the game varies, each player is required to perform an operation in consideration of the affection on the opponent player.

Incidentally, FIG. 4 illustrates the state where only one object 60 is displayed in the game region 52. However, a plurality of objects 60 different in terms of position, speed or path from each other may be displayed in the game region 52. In this case, the control of the display and movement of the object 60 such as the appearance position, the travel path and the disappearance position of each object 60 is performed for each object 60 by following the above-described example.

Figure 6:
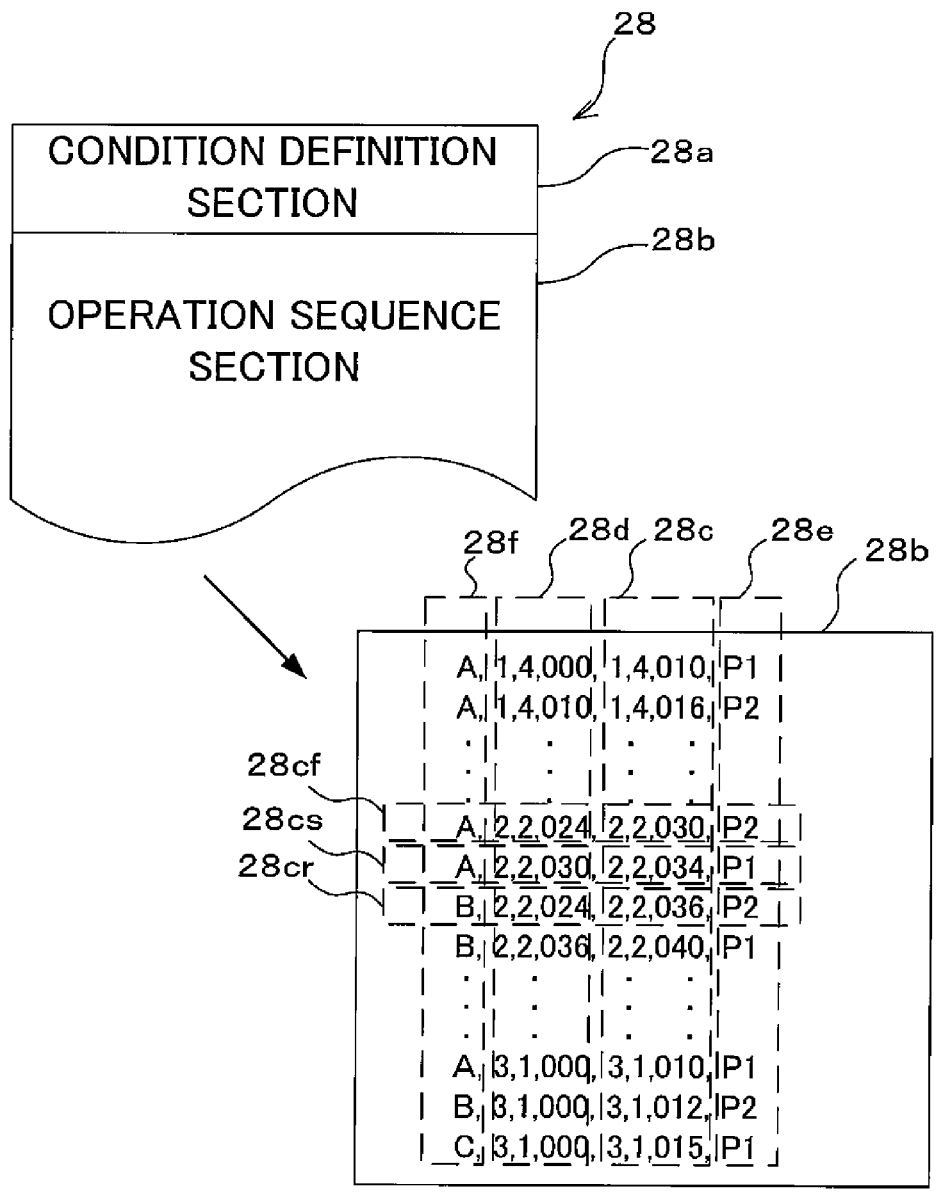
FIG. 6 is a diagram illustrating an example of sequence data.

Next, the sequence data 28 will be described in detail with reference to FIG. 6. The sequence data 28 includes a condition definition section 28a and an operation sequence section 28b. In the condition definition section 28a, recorded is information for designating game execution conditions different for each tune, such as a music tempo, a music beat, a music track, information for designating a sound effect to be generated at the moment when the object 60 is touched, and the like. Incidentally, although FIG. 6 illustrates that the condition definition section 28a is provided only at the head of the sequence data 28, the condition definition section 28a may be added at an appropriate position in the middle of the operation sequence section 28b. Thereby, processing such as the change of tempo in a tune and the change of allocation of the sound effects can be implemented.

On the other hand, in the operation sequence section 28b, the time to touch the object 60, the time to start display, and information indicating the player that should perform a touch operation (that is, information indicating one of the reference portions 55A and 55B at which the object 60 should arrive), are recorded in association with each object 60. As illustrated partially in detail in FIG. 6, the operation sequence section 28b includes an operation time portion 28c indicating the time (operation time) to perform a touch operation during the tune, an operation start information section 28d setting the display start time to start the display of the object 60, a display position indication section 28e indicating the player to whom the display of the object 60 should be started (in other word, either one-side reference portion where the display of the object 60 should be started), and a marker information section 28f indicating the object 60 to be displayed. The operation sequence section 28b is configured as a set of a plurality of records, where the operation time to perform an operation during the tune, the display start time of the object 60, and the player to whom the display of the object 60 is started are recorded in association with each other for each object 60 to be displayed. The operation time and the display start time are described in such a way the value indicating the bar number in the tune, the number of beats, and the time in a beat is divided with commas. The time in a beat is the lapse time from the head of one beat, and is represented by the number of units from the head of single beat when the single beat time length is equally divided by n unit times. For example, under n=100, and in the second beat in the first bar of the tune, the time of ¼ beat from the head of the beat is described as "01, 2, 025".

The operation time portion 28c includes the operation time which is set so that the time interval between one operation time and another operation time next to the one operation is less than a predetermined value. In the example of FIG. 6, a specific operation time 28cs corresponding to the one operation, a previous operation time 28cf followed by the specific operation time 28cs, and a next operation time 28cr corresponding to the next operation time as the next operation time to the specific operation time 28cs are surrounded by broken lines. In the example of FIG. 6, to the display start time of the next operation time 28cx, set is the operation time coincident with the operation time set to the previous operation time 28cf. The object 60 correlated to the next operation time 28cr is different from the object 60 correlated to the previous operation time 28cf and the specific operation time 28cs.

With respect to the indication of the player to whom the display of object 60 is started, when the first player should be indicated, 'P1' is indicated, and when the second player should be indicated, 'P2' is indicated. With respect to the record to which 'P1' indicating the first player is set, the record indicates that the object 60 should arrive at the first reference portion 55A at the operation time indicated in the operation time portion 28c. On the other hand, with respect to the record to which 'P2' indicating the second player is set, the record indicates that the object 60 should arrive at the second reference portion 55B at the operation time indicated in the operation time portion 28c. In addition, the indication of the player also corresponds to the indication of the color of the displayed object 60. The blue object 60 is displayed in the case of 'P1', and the red object 60 is displayed in the case of 'P2'.

In the marker information portion 28f, information indicating the object 60 to be displayed is recorded by using alphabets such as 'A.' The information is set to discriminate each object 60 in the case when a plurality of objects 60 are displayed in the game region 52. That is, 'A' is used as an alphabet corresponding to the first object 60 to be displayed in the game region 52, 'B' is used as an alphabet corresponding to the second object 60, and 'C' is used as an alphabet corresponding to the third object 60. That is, as information indicating the object 60 to be displayed, used are alphabets the kinds of which corresponds to the number of objects 60 to be displayed in the game region 52. The information indicating the object 60 also represents the correlation between the operation times. Specifically, with respect to each of the operation times correlated to the information indicating a common object 60, the position where the object 60 arrives corresponding to one operation time functions as the appearance position of the object 60 corresponding to the other operation time to which the display start time nearest (or equal) to the one operation time is set. Incidentally, in the case when there is a plurality of records designating the same operation time, the appearance position of the object 60 corresponding to other operation time (the object 60 to appear next) may be specified by specifying any one of the records designating the same operation time by a predetermined condition or the like, for example, may be specified by specifying a record having the earliest display start time, or specifying a record allocated in the earliest line in the sequence data 28.

In the example of FIG. 6, the display start time, the operation time, and the reference portion where the display of the object 60 is started are indicated in such a manner that the blue object 60 is displayed on the first reference portion 55A corresponding to the first player at the start time point (000) of the fourth beat of the first bar, and moves along the path W from the first reference portion 55A so as to arrive at the second reference portion 55B at the moment after the lapse time corresponding to '010' from the start time point of the fourth beat of the first bar. Also, at the time after the lapse time corresponding to '010' from the start time point of the fourth beat of the first bar, the red object 60 is displayed using the rebound point R2 where the object 60 has arrived as the appearance position. Then, the red object 60 moves from the second reference portion 55B along the path W corresponding to the touch operation position of the player so as to arrive at the first reference portion 55A at the moment after the lapse time corresponding to '016' from the start time point of the fourth beat of the first bar. Further, at the moment after the lapse time corresponding to '024' from the start time point of the second beat of the second bar, the red object 60 corresponding to the previous operation time 28cf and the second red object 60 corresponding to the next operation time 28cr appear at the rebound point R2 where the object 60 has arrived immediately before, the rebound point R2 being on the second reference portion 55B used as the reference of the second player. The first object 60 moves along the path W so as to arrive at the first reference portion 55A at the moment after the lapse time corresponding to '030' from the start time point of the second beat of the second bar, and the second object 60 moves along the path W so as to arrive at the first reference portion 55A at the moment after the lapse time corresponding to '036' from the start time point of the second beat of the second bar. Incidentally, in the example of FIG. 6, there is a record indicating the object 60, after arriving at the first reference portion 55A at the moment after the lapse time corresponding to "030" from the start time point of the second beat of the second bar, to move from the arrival position so as to arrive at the first reference portion 55A at the moment after the lapse time corresponding to '030' from the start time point of the second beat of the second bar, and the record corresponds to a record of the specific operation time 28cs.

The object 60 moving repeatedly between the reference portions 55A and 55B by the appropriate operations performed by the players has been described above. However, may be added a type of object which only disappears, without reciprocating, in response to the operation of the one-side player so as not to reverse the travel direction. Furthermore, various kinds of objects such as a plurality of objects appearing in a linked state with each other may be made to appear in the game region 52 as well as the reciprocation-type object 60.

Hereinafter, the processing of the game control unit 11 when the music game is executed in the game machine 2 will be described. Incidentally, in the following, it is assumed that processing necessary to start a game, such as initialization, matching, and selection of a tune or the degree of difficulty, have been completed. Since the game machines 2 of the combined players progress the game in the same procedure as each other, only the processing of the one-side game machine 2 will be described below.

When the game is started between the combined players, the game control unit 11 reads the tune data 25 corresponding to the tune selected by the player and outputs the read tune data 25 to the audio output control unit 13, thereby starting reproduction of the tune from the speaker 14. Accordingly, the control unit 10 functions as a music reproducing unit. Also, in synchronization with the tune reproduction, the game control unit 11 reads the sequence data 28 corresponding to the selection of the player, generates image data necessary to draw the game region 52 and the information region 53 with reference to the image data 27, and outputs the generated image data to the display control unit 12, thereby displaying the game region 52 and the information region 53 on the monitor 8. In addition, during the execution of the music game, as the processing necessary for displaying the game region 52 or the like, the game control unit 11 repeatedly executes a sequence processing routine illustrated in FIG. 7 at predetermined cycles. The cycle is equal to a cycle for drawing the game screen 50, that is, a frame rate.

Figure 7:
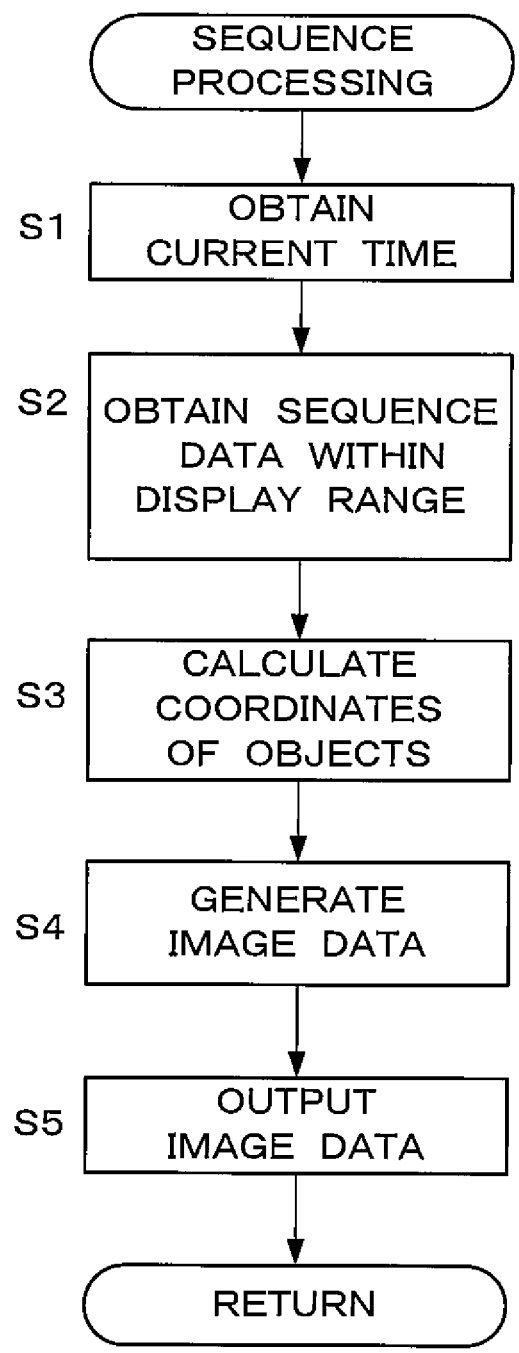
FIG. 7 is a flow chart of a sequence processing routine.

In the sequence processing routine illustrated in FIG. 7, the game control unit 11 obtains the current time on the tune at step S1. For example, using the reproduction start time point of the tune as a criterion, clocking is started by an internal clock of the game control unit 11, and the current time is obtained from the value of the internal clock. The time on the tune may be specified by the lapse time from the reproduction start time point, or may be specified by the other value relating to the lapse time. For example, the time on the tune may be specified by using the number of beats of the tune from the tune reproduction start time point, the number of frames of the game screen 50, or the like. At successive step S2, the game control unit 11 obtains from the sequence data 28 and stores in the internal storage device, the data of the display start time and the operation time, each existing in the time length corresponding to the display range of the game region 52 to be drawn in the next frame. As one example, the display range is set to a time range corresponding to two bars of the tune from the current time (herein, the time in drawing the next frame) toward the future, and a time range corresponding to the end portions 52U and 52B of the game region 52 from the current time. At step S3, the game control unit 11 calculates the coordinates of all the objects 60 in the game region 52, the objects 60 being to be drawn in the next frame. Details of the calculation will be described below.

At step S4, the game control unit 11 generates image data necessary to draw the game region 52, based on the coordinates of the objects 60 calculated at step S4. Specifically, the image data is generated so that the respective objects 60 are disposed at the calculated coordinates. The images of the objects 60 may be obtained from the image data 27. At successive step S5, the game control unit 11 outputs the image data to the display control unit 12. Thereby, the display of the game region 52 on the monitor 8 is updated. When the processing of step S5 is completed, the game control unit 11 ends the sequence processing routine of this time. By repeatedly executing the above processing, the display of the object 60 is controlled such that the object 60 appears at any one of the reference portions 55A and 55B at a predetermined display start time, moves along the path W in accordance with the progress of the tune, and arrives at the other one of the reference portions 55A and 55B at a predetermined operation time.

Figure 8:
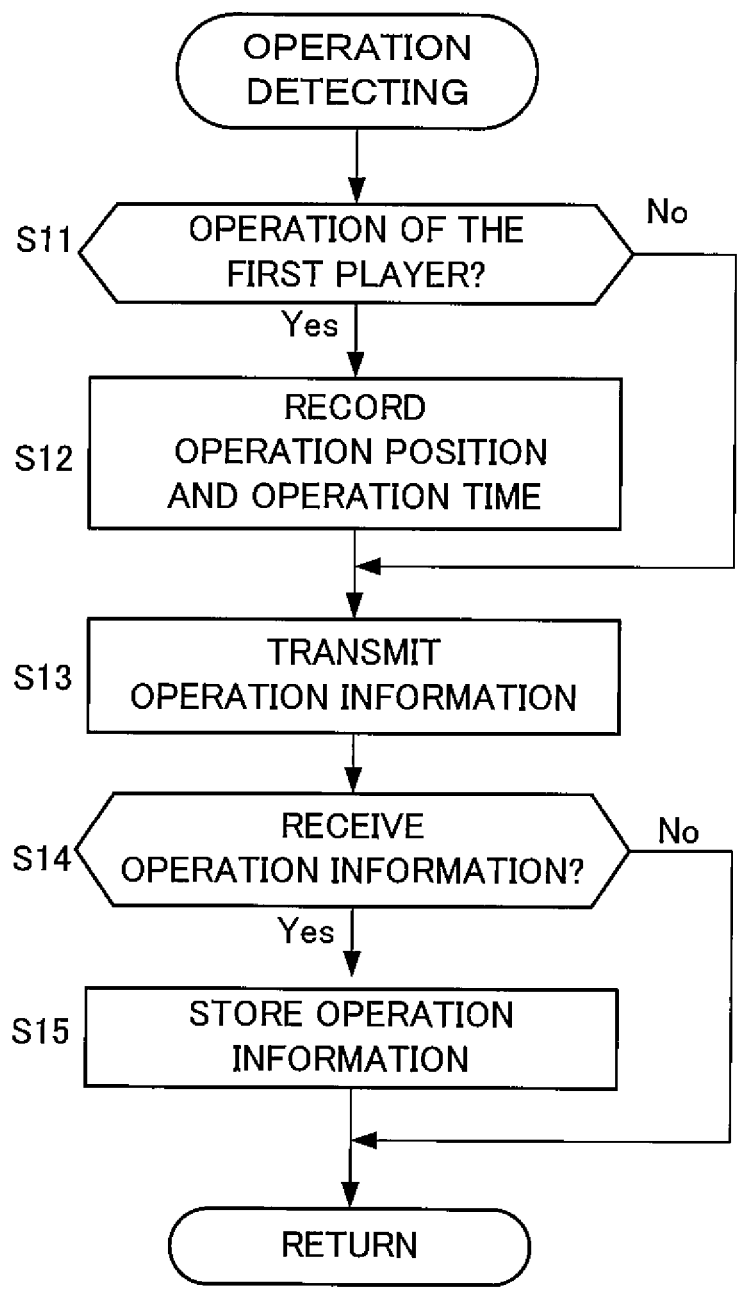
FIG. 8 is a flow chart of an operation detecting routine.

In parallel with the above-described sequence processing routine, the game control unit 11 repeatedly executes the operation detecting routine of FIG. 8 at appropriate cycles. Incidentally, the cycle that the routine of FIG. 8 is executed is equal to or shorter than the cycle that the routine of FIG. 7 is executed. The operation detecting routine is the processing that is executed to obtain the contents of the touch operations (the operation position and the operation time) of the first player and the second player. When starting the operation detecting routine, the game control unit 11 determines, at step S11, whether the first player has performed a touch operation after completion of the previous routine with reference to the output of the touch panel 9. When the touch operation has been performed, the game control unit 11 proceeds to step S12. At step S12, the game control unit 11 obtains the position where the first player has touched and the time when the touch operation has been performed, generates operation information where the position and the time are recorded, and stores the generated operation information in the internal storage device. At successive step S13, the game control unit 11 transmits the operation information stored at step S12 to the game machine 2 of the opponent player.

At step S14, the game control unit 11 determines whether the operation information has been received from the game machine 2 of the opponent player after completion of the previous routine. When the operation information has been received, the game control unit 11 proceeds to step S15. At step S15, the game control unit 11 stores the received operation information in the internal storage device. When the processing of step S15 is completed, the game control unit 11 ends the processing of the operation detecting routine of this time. Incidentally, when the determination at step S11 is negative, the game control unit 11 skips steps S12 and S13 and proceeds to step S14. When the determination at step S14 is negative, the game control unit 11 skips step S15 and ends the operation detecting routine. The operation time of each of the first player and the second player included in the operation information stored by the processing of FIG. 8 are treated as the actual operation time of each player. However, the operation time may be later than the time when this processing for detecting the actual operation time is performed. For example, when a communication delay occurs in the network 5 and thus gap time occurs between the transmission time of the operation information from the other game machine and the reception time of the operation information in the own game machine, the time when the operation information is detected may be measurably delayed in comparison with the actual operation time included in the operation information. One object of the present invention is to cope with such a delay.

Incidentally, in parallel with the above-described processing, the game control unit 11 executes the processing of extracting the record on the sequence data 28 corresponding to the touch operation of each player, comparing the operation time on the extracted record with the actual operation time of the player, and evaluating each operation of the player in a plurality of steps depending on the gap time between the two operation times. However, the processing may be the same as that of the publicly-known game machine, and a detailed description thereof will be omitted.

Figure 9:
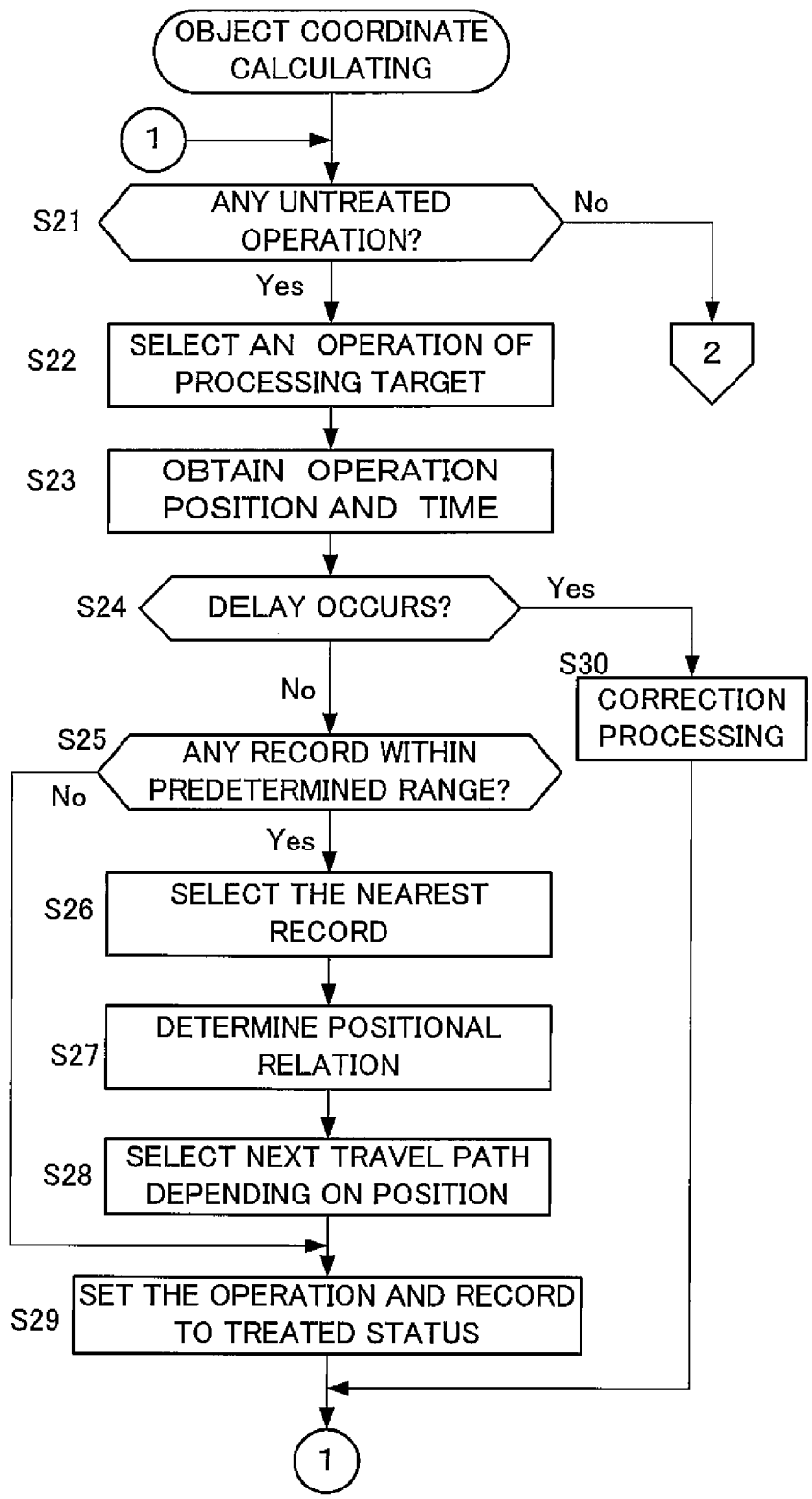
FIG. 9 is a flow chart of an object coordinate calculating routine.

Next, an object coordinate calculating routine executed by the game control unit 11 to calculate the coordinates of the object 60 will be described with reference to FIGS. 9 to 13. Incidentally, the object coordinate calculating routine is performed as a subroutine of step S3 shown in FIG. 7. As illustrated in FIG. 9, when starting the object coordinate calculating routine, the game control unit 11 determines whether there is any untreated operation at step S21. The untreated operation is each operation that is obtained in the operation detecting routine of FIG. 8 during time from the moment of previous object coordinate calculation up to the current time, and plus, an operation that is not set to treated status in the object coordinate calculating routine of this time. When there is at least one untreated operation, the game control unit 11 proceeds to step S22. At step S22, the game control unit 11 selects one operation of processing target from the untreated operations. At successive step S23, the game control unit 11 obtains the position and the time with respect to the operation of processing target.

At next step S24, the game control unit 11 determines whether a predetermined delay has occurred in the detection of the operation time (the detection time). That is, the operation time obtained at steps S11 and 12 is the time when the game machine 2 has detected an actual operation on the touch panel 9 thereof, and it has no delay or a negligible level of delay. However, as for the operation time included in the operation information transmitted from the other game machine, due to the congestion of the network or the like, measurable gap time may occur between the time when the actual operation has been performed at the other game machine and the time when the game control unit 11 of the own game machine 2 receives the operation information at step S14 of FIG. 18 and detects the operation. The game machine 2 controls the display of the object 60 such that the object 60 is reversed when gap time between the time when the actual operation has been performed and the operation time recorded in the sequence data 28 is within a predetermined range. Therefore, when a measurable delay occurs in the detection of the operation time, the object 60 moves the distance corresponding to gap time, and a measurable influence could occur with respect to the display of such object 60. Thus, at step S24, the game control unit 11 compares the current time on the game with the operation time recorded in the operation information of processing target, and determines whether or not a measurable delay has occurred. However, up to a certain degree of gap time to the current time is not regarded as a delay, and a positive determination may be made at step S24 when such delay as time length thereof exceeds a predetermined allowable range has occurred.

When determining at step S24 that the predetermined delay has not occurred, the game control unit 11 proceeds to step S25. At step S25, the game control unit 11 determines whether or not any record exists in the range of sequence data 28, which been obtained at step S2 of FIG. 7, the record having the operation position and the operation time, a predetermined range of which includes the operation position and operation time obtained step S23 (which may be hereinafter referred to as the record within a predetermined range). Herein, the predetermined range is a timelike range set as an allowable range where it can be regarded an appropriate operation has been performed with respect to the operation time designated in the sequence data 28, and plus, a distance range set as an allowable range where it can be regarded that the object 60 has been touched to the arrival position of the object 60 in the reference portion 55A (or 55B) (the rebound point as a movement destination).

When determining at step S25 that at least one record within the predetermined range is present, the game control unit 11 proceeds to step S26. At step S26, as a comparison target, the game control unit 11 selects a record having the nearest operation time with respect to the operation time and operation position obtained at step S23 from the records within the predetermined range. At successive step S27, the game control unit 11 determines the positional relation between the position of the touch operation and the object 60 displayed in association with the record selected at step S26. Here, it is determined which of the four regions O, R, S and L illustrated in FIG. 5 the position where the touch operation is performed belongs to, or it is determined which of the four regions O, R, S and L the position where the touch operation is performed is closest to. At next step S28, based on the position determined at step S27, the game control unit 11 selects the path W which the object 60 should move next along with. The selection is the same as that illustrated with reference to FIG. 5. After selecting the path W at step S28, the game control unit 11 proceeds to step S29. At step S29, the game control unit 11 sets to treated status the operation and record treated in the routine of this time. Thereafter, the game control unit 11 returns to step S21.

The record set to treated status at step S29 includes not only the record selected as the comparison target at step S26, but also the record associated with the selected record with respect to the display start time. That is, included is a record which is coincident with the record of comparison target in the information indicating the object 60 in the marker information portion 28f of the sequence data 28 illustrated in FIG. 5, and plus, the display start time of which is equal to the operation time of the record of comparison target. Hereinafter, such a record is sometimes referred to as a subsequent record, and a record associated with the subsequent record is sometimes referred to as a preceding record. Incidentally, the path W determined at step S28 is stored as the path W for the subsequent record, and the path W for the preceding record is discarded. In the case where it is determined at step S24 that the delay has occurred, the game control unit 11 proceeds to step S30. At step S30, the game control unit 11 executes a correction processing. Details of the correction processing will be described below with reference to FIGS. 12 and 13. After completion of the correction processing, the game control unit 11 returns to step S21.

By the above steps S21 to S30, the processing of changing the path W in association with the operation of each of the first player and the second player is completed. When it is determined at step S21 that there is no untreated operation, the game control unit 11 proceeds to step S31 of FIG. 10. The processing from step S31 is the processing performed on the record that has been stored in the internal storage device at step S2 of FIG. 7 and has not been set to treated status at step S29. At step S31, within the untreated records, with respect to the records the operation time of which has passed the current time, the game control unit 11 determines whether or not the object 60 corresponding to each of such records arrives at the end portion 52U or 52B. In this processing, it is determined whether or not the object 60 can move the distance up to the end portion 52U or 52B during the time up to the display time of the next frame, by using the coordinates and the travel speed of each object 60 calculated in the previous routine of the object 60.

When it is determined at step S31 that the object 60 arrives at the end portion 52U or 52B, the game control unit 11 proceeds to step S32. At step S32, as the next path W corresponding to the object 60, the game control unit 11 selects the shortest-distance path (the shortest path) connecting the arrival position of the object 60 and the next rebound point R1 (or R2). At successive step S33, the game control unit 11 sets to treated status, the record corresponding to the object 60 to which the shortest path has been set. In this case, not only the record determined to arrive at the end portion 52U or 52B, but also the subsequent record associated with the determined record with respect to the display start time is set to treated status. The processing is the same as step S29 in this point. Then, the shortest path is stored in association with the subsequent record, and the path of the preceding record is discarded.

At next step S34, the game control unit 11 determines whether or not there is any untreated record. Incidentally, when the determination at step S31 is negative, the game control unit 11 skips steps S32 and S33, and proceeds to step S34. When it is determined at step S34 that there is at least one untreated record, the game control unit 11 proceeds to step S35. At step S35, the game control unit 11 selects one record of processing target from the untreated records. At successive step S36, the game control unit 11 determines whether or not the path W has been already determined in the previous routine with respect to the record of processing target. When the path W has been already determined, the game control unit 11 proceeds to step S37. At step S37, the game control unit 11 maintains the previously-determined path W as the path W of the record of processing target. Incidentally, as for the record the path of which has been already discarded, a positive determination is made at step S36, and the discarded state is maintained at step S37.

On the other hand, when it is determined at step S36 that the path W has not been determined, the game control unit 11 proceeds to step S38. At step S38, the game control unit 11 determines whether or not the path W of the preceding record associated with the record of processing target should be maintained. Herein, the preceding record is a record where designated is the same information of the marker information portion 28f as the record of processing target and the display start time of the record of the processing target is designated as the operation time. When an appropriate touch operation has been performed to the preceding record, the next path W corresponding to the subsequent record associated with the preceding record is selected by the processing of FIG. 9 and thereby the preceding record and the subsequent record associated therewith are set to treated status at step S29. However, as for the preceding record to which an appropriate touch operation has not been performed, until the corresponding object 60 is reversed at the end portion 52U or 52B and starts the movement along the shortest path, the previous path W needs to be maintained toward the end portion 52U or 52B. This movement of the object 60 can be realized by maintaining the path W at step S37 when a negative determination is made at step S31 and positive determinations are made at steps S34 and S36 respectively. When the object 60 is displayed in movement based on the preceding record, it is necessary to prevent the appearance of the object 60 of the subsequent record associated with the preceding record. At step S38, the game control unit 11 determines whether or not the path W of the preceding record associated with the processing target is maintained. When the determination at step S38 is positive, the game control unit 11 determines that the object 60 should not be made to appear with respect to the record of processing target and proceeds to step S39. At step S39, the game control unit 11 defers the selection of the path W with respect to the record of processing target.

On the other hand, when the determination at step S38 is negative, the game control unit 11 proceeds to step S40. In this case, there is no preceding record which is associated with the record of processing target and the path W of which should be maintained. In other words, the record of processing target is a record that a new object 60 should be made to appear in the game region 52 of the next frame. Thus, at step S40, the game control unit 11 selects a new path W with respect to the record of processing target. In this case, when the record of processing target designates the operation of the first player, the rebound point R2 on the reference portion 55B is determined and one path W extending from the rebound point R2 toward the reference portion 55A is selected. On the other hand, when the record of processing target designates the operation of the second player, the rebound point R1 on the reference portion 55A is determined and one path W extending from the rebound point R1 toward the reference portion 55B is selected.

When the processing at step S37, S39 or S40 is completed, the game control unit 11 proceeds to step S41. At step S41, the game control unit 11 sets the record of processing target to treated status. Thereafter, the game control unit 11 returns to step S34. When all of the records have been treated, a negative determination is made at step S34. In this case, the game control unit 11 proceeds to step S51 of FIG. 11. The processing from step S51 is the processing of determining, for the record to which a path W has been determined, a position (coordinates) of the object 60 on the path W. That is, as for the record the path of which is discarded or has not yet been determined, since the object 60 is not necessary to be displayed, it is excluded from the coordinate calculation target.

At step S51, the game control unit 11 determines whether or not there is any record the coordinates of which have not been determined within the records the path W of which has been selected. When there is the record, the game control unit 11 proceeds to step S52. At step S52, the game control unit 11 selects the record of calculation target. At next step S53, the game control unit 11 obtains the current position of the object 60 corresponding to the record of calculation target. As the current position, the position set at the previous routine may be used. It may be determined that there is no current position with respect to the object 60 that should be made to appear newly. At subsequent step S54, the game control unit 11 calculates a distance from the current position of the object 60 to the rebound point along the path W. At subsequent step S55, the game control unit 11 calculates, as remaining time, the gape time between the current time and the time when the object 60 should arrive at the rebound point (that is, the operation time designated in the record). Thereafter, the game control unit 11 proceeds to step S56 to calculate the new coordinates of the object 60 corresponding to the record of calculation target, that is, the position of the object 60 in the game region 52 of the next frame. The new coordinates can be obtained in such a way: The travel speed of the object 60 is calculated by dividing the distance by the remaining time. Then a distance (the travel distance) that the object 60 should move up to the next frame is calculated from the travel speed and the time interval up to the next frame. Then the position after travelling the travel distance along the path W is defined as the new coordinates. However, as for the object 60 to appear newly, the appearance position may be defined as the new coordinates. Also, as for the object 60 passing through the reference portion 55A or 55B and moving toward the end portion 52U or 52B, the new coordinates can be calculated by using the travel speed used in the previous calculation.

When the processing of step S56 is completed, the game control unit 11 proceeds to step S57. At step S57, the game control unit 11 sets the record of calculation target as a record of determined coordinates. Thereafter, the game control unit 11 returns to step S51. When there becomes no record of undetermined coordinates, a negative determination is made at step S51. Thereby, the game control unit 11 ends the object coordinate calculating routine of this time.

Figure 10:
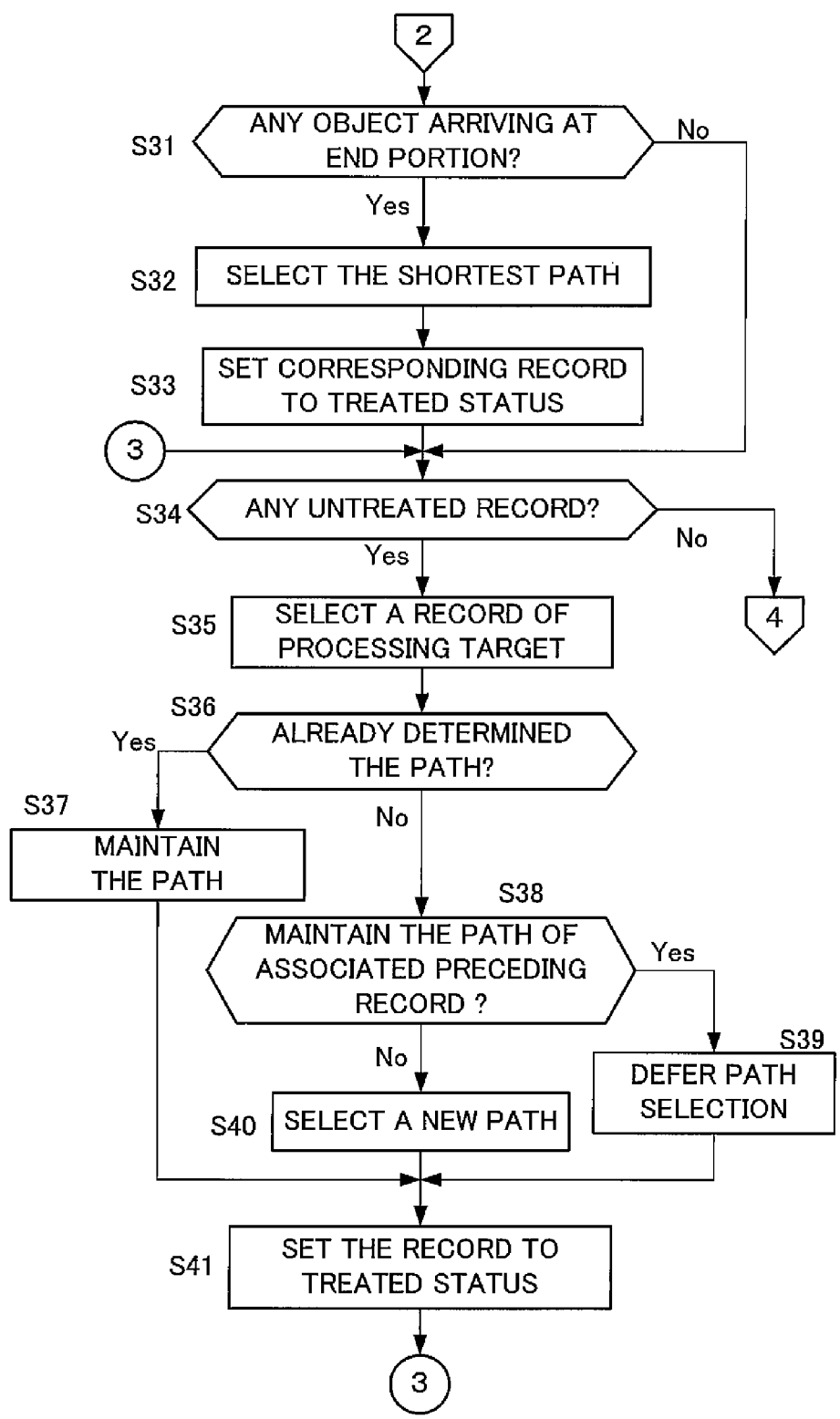
FIG. 10 is a flow chart following FIG. 9.
Figure 12:
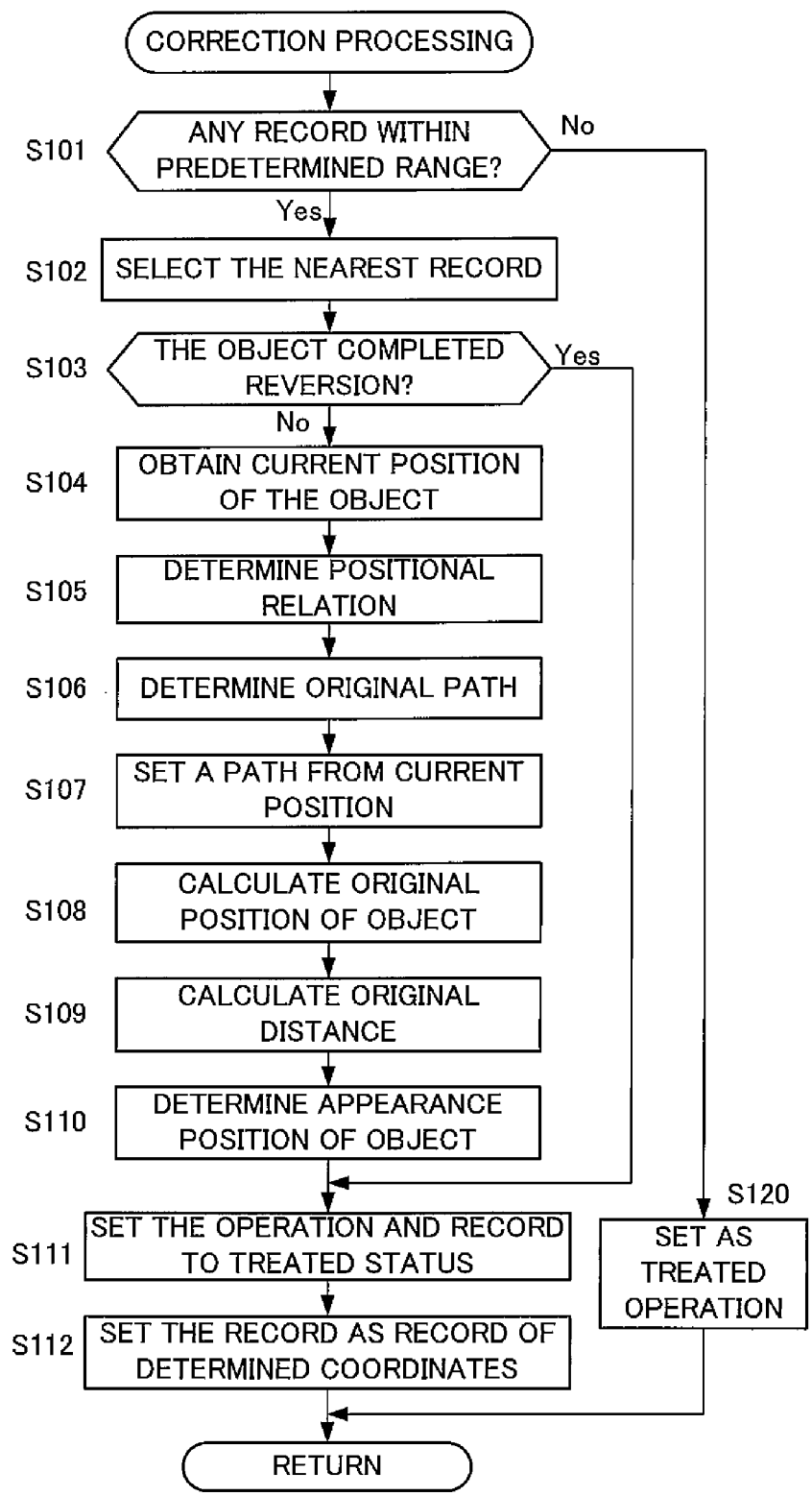
FIG. 12 is a flow chart of a correction processing routine.
Figure 13:
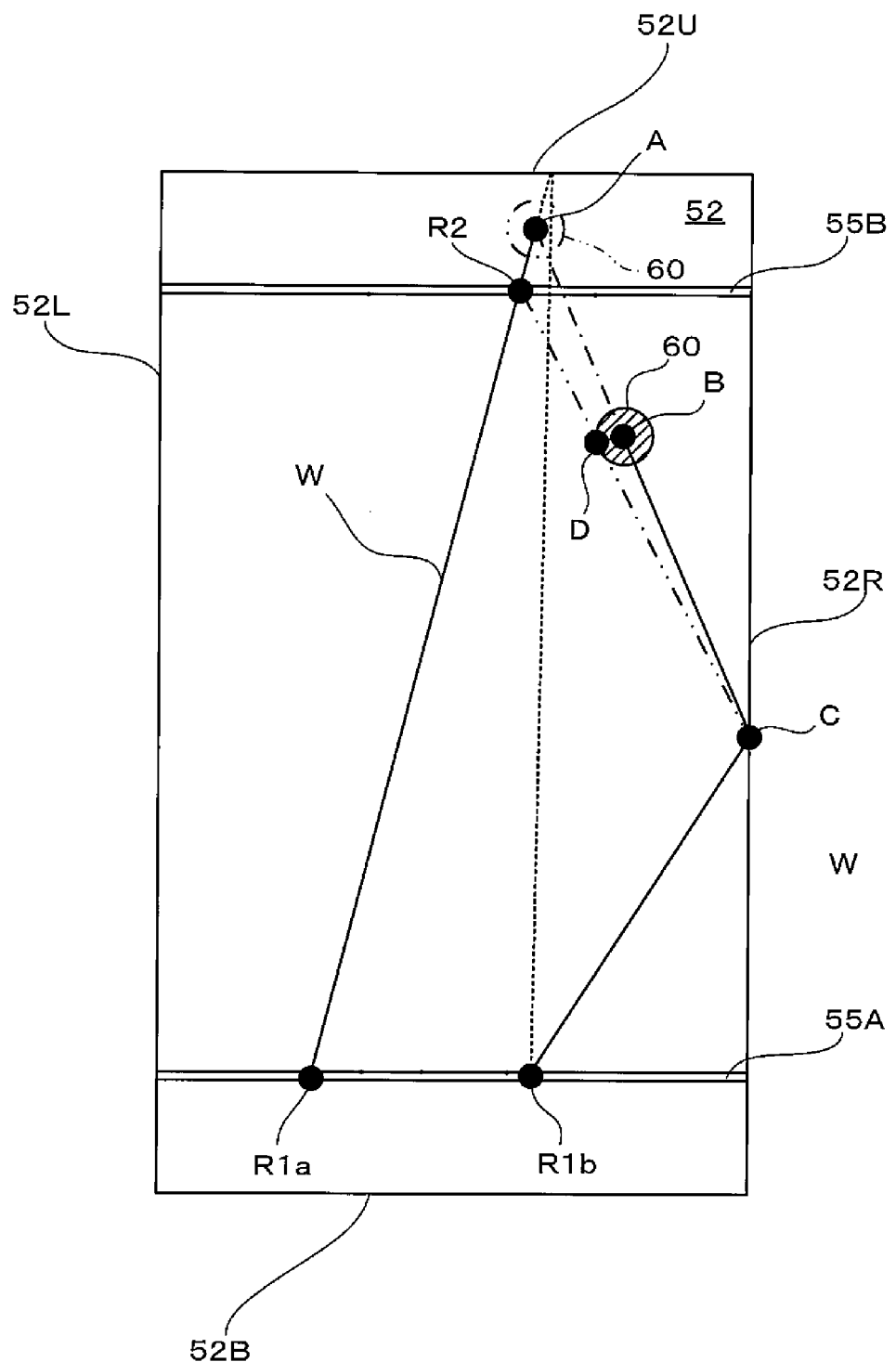
FIG. 13 is a diagram illustrating a travel path of the object in a case that the correction processing is applied.

Next, details of the correction processing at step S30 of FIG. 10 will be described with reference to FIGS. 12 and 13. FIG. 12 is a flow chart illustrating a detailed procedure of the correction processing, and FIG. 13 shows an example of the game region 52 to which the correction processing is applied. When proceeding to the correction processing at step S30 by determining at step S24 in FIG. 9 that the delay has occurred, the game control unit 11 determines at step S101 of FIG. 12 whether or not any record is present in the range of sequence data 28, which is obtained at step S2 of FIG. 7, a record (sometimes referred to as the record within a predetermined range) having the operation position and operation time, a predetermined range of which includes the operation position and operation time included in the operation information as processing target, that is, the operation information to which it is determined that the delay has occurred (hereinafter, sometimes referred to as delay information). Herein, the predetermined range is, similarly to step S25 in FIG. 9, a timelike range set as an allowable range where it can be regarded an appropriate operation has been performed with respect to the operation time designated in the sequence data 28, and is also a distance range set as an allowable range where it can be regarded that a object 60 has been touched at an arrival position (the rebound point as a movement destination) of the object 60 in the reference portion 55A (or 55B). Namely, the processing of step S101 is processing for, by referring to the operation position and the operation time included in the delay information, retrospectively determining whether the operation was an appropriate operation with respect to any record included the sequence data 28. However, even when such a record was present, the object 60 corresponding to the record has already passed through the reference portion 55A according to the processing of step S31 and later in FIG. 10. Thus, the object 60 could be reversed at the end portion 52B and travel along the next path W.

When it is determined at step S101 that the record within the predetermined range is not present, the game control unit 11 proceeds to step S120. At step S120, the game control unit 11 sets the operation included in the delay information as a treated operation and completes the correction processing. On the other hand, when it is determined at step S101 that the record within the predetermined range is present, the game control unit 11 proceeds to step S102. At step S102, the game control unit 11 selects a record from the records within the predetermined range as a comparison target, the record having the nearest operation time with respect to the operation time obtained at step S23 of FIG. 9. At successive step S103, the game control unit 11 determines whether or not the object 60 corresponding to the record of comparison target has completed reversion at the end portion 52U. In this case, as an example, the game control unit 11 may determine whether or not the path W is set in the record of the comparison target, and when the path W is not set in the record of the comparison target, the game control unit 11 may determine that the reversion has been completed. Because, as illustrated in FIG. 10, when the object 60 is reversed at the end portion 52U, a new shortest path is set to the associated record and the path W of the object 60 before arrival at the end portion 52U is discarded.

When it is determined at step S103 that the object 60 has not completed the reversion, the game control unit 11 proceeds to step S104. At step S104, the game control unit 11 obtains the current position of the object 60 corresponding to the record of comparison target. The current position may be obtained by referring to the processing result of the previous object coordinate calculating routine. At this moment, gap time between the current time and the operation time included in the delay information is obtained as delay time. At step S105, the game control unit 11 determines the positional relation between the position of the touch operation included in the delay information and the object 60 corresponding to the record of comparison target. This processing is the same as step S27 of FIG. 9. However, at the moment of executing the processing of step S105, the object 60 has travelled a distance corresponding to the delay time relatively to the position of the object 60 at the operation time. Therefore, herein, it is necessary to return the position of the object 60 toward the reference portion 55A side for the distance corresponding to the delay time and determine the positional relation. At successive step S106, the game control unit 11 determines the original path of the object 60 based on the determination result of the positional relation. At step S107, with reference to the determination result, the game control unit 11 sets the path W extending from the current position of the object 60. An example of the method of setting the path W is explained with reference to FIG. 13.

In FIG. 13, it is assumed that: the path W is set from the rebound point R1a on the reference portion 55A of the first player toward the rebound point R2 on the reference portion 55B of the second player; and according to the operation time included in the delay information, the second player performed the touch operation at the moment when the object 60 moving along the path W arrived at the rebound point R2; but, due to a delay of the operation information, in the game machine 2 of the second player, the operation of the second player is detected at the moment when the object 60 has passed through the rebound point R2 and arrived at a point A, and thus the correction processing is started. In addition, it is assumed that in a case where there was no delay of the operation information, the object 60 should have changed the travel direction at the rebound point R2 and the path which extends from the rebound point R2 to the rebound point R1b through a turnaround point C, should have been originally set. In this case, at step S104, the point A is obtained as the current position of the object 60. At step S105, assuming that the object 60 was located at the rebound point R2, the object 60 and the operation position included in the delay information are compared with each other. Thereby, at step S106, it is determined that the original path should have been set such that the object moves from the rebound point R2 to the rebound point R1b through the turnaround point C. In this case, at step S107, the game control unit 11 sets the path W such that the object 60 moves from the current position A to the rebound point R1b through the turnaround point C.

Returning to FIG. 12, when the path W is set at step S107 the game control unit 11 proceeds to step S108. At step S108, the game control unit 11 calculates the original position of the object 60 based on the delay time calculated at step S104 and the original path determined at step S106. That is, assuming that there was no delay of the operation information, the coordinates of the object 60 in the next frame are calculated. At FIG. 13, a point D on a virtual line extending from the rebound point R2 toward the turnaround point C is the original position of the object 60.

At step S109, the game control unit 11 calculates a distance along the original path extending from the original position D to the rebound point R1b through the turnaround point C. At next step S110, the game control unit 11 calculates the position (the coordinates) of the point B a distance from which to the rebound point R1*b* on the path set at step S107 is equal to the distance calculated at step S109, and determines the calculated position as the appearance position of the object 60. That is, at FIG. 13, the position of point B is calculated such that the distance of points B-C-R1*b* is equal to the distance of points D-C-R1*b*, and the point B is set as the appearance position of the object 60 in the next frame. By setting the appearance position in this manner, since the travel speed of the object 60 decreases in comparison with the case of moving the object 60 from the point A to the rebound point R1*b* at a constant speed, even when a delay occurs in the detection of the operation time, it is possible to prevent the possibility that the travel speed of the object 60 increases excessively.

When the appearance position of the object 60 is determined at step S110, the game control unit 11 proceeds to step S111. At step S111, the game control unit 11 sets to treated status, both of the operation included in the delay information and the record selected as the comparison target at step S102 in association with the operation. Incidentally, when the determination at step S103 is positive, the game control unit 11 skips steps S104 to S110 and proceeds to step S111. Because, in a case where the object 60 has been reversed at the end portion 52U, the shortest path has been set and the travel speed of the object 60 is relatively low, and thus it is not necessary to reduce the travel speed of the object 60 by the correction processing.

The record set to treated status at step S111 includes not only the record selected as the comparison target at step S102, but also includes the subsequent record which is associated with the selected record as the preceding record. The relation between the preceding record and the subsequent record is the same as described above. This processing is the same as step S29. In addition, at successive step S112, the game control unit 11 sets as a record of determined coordinates, the subsequent record set to treated status at step S111. Thereby, as for the record for which the appearance position of the object 60 is determined by the correction processing corresponding to the delay information, as a negative determination is made at step S51 of FIG. 11, the coordinates of the object 60 are not overlappingly calculated in the routine of this time. When the processing of step S112 is completed, the game control unit 11 completes the correction processing and returns to step S21 of FIG. 9. When all operations are processed and the coordinates of all objects 60, which should be made to appear in the display range of the next frame, are calculated, a negative determination is made at step S51 of FIG. 11 and the object coordinate calculating routine is ended. Then the image data is generated at step S4 of FIG. 7, with reference to the calculated coordinates.

In the above embodiment, the game control unit 11 functions as an own game machine operation detecting unit by executing steps S11 and S12 of FIG. 8. The game control unit 11 functions as an operation information transmitting unit by executing step S13 of FIG. 8. The game control unit 11 functions as another game machine operation detecting unit by executing steps S14 and S15 of FIG. 8 Also, the game control unit 11 functions as a marker display control unit by executing the sequence processing routine of FIG. 7 and the subroutines of FIGS. 11 and 12. In addition, the game control unit 11 functions as a delay determining unit by executing step S24. The game control unit 11 functions as a correction unit by executing step S30 of FIG. 9 and the subroutine of FIG. 12 as the subroutine of step S30.

Figure 11:
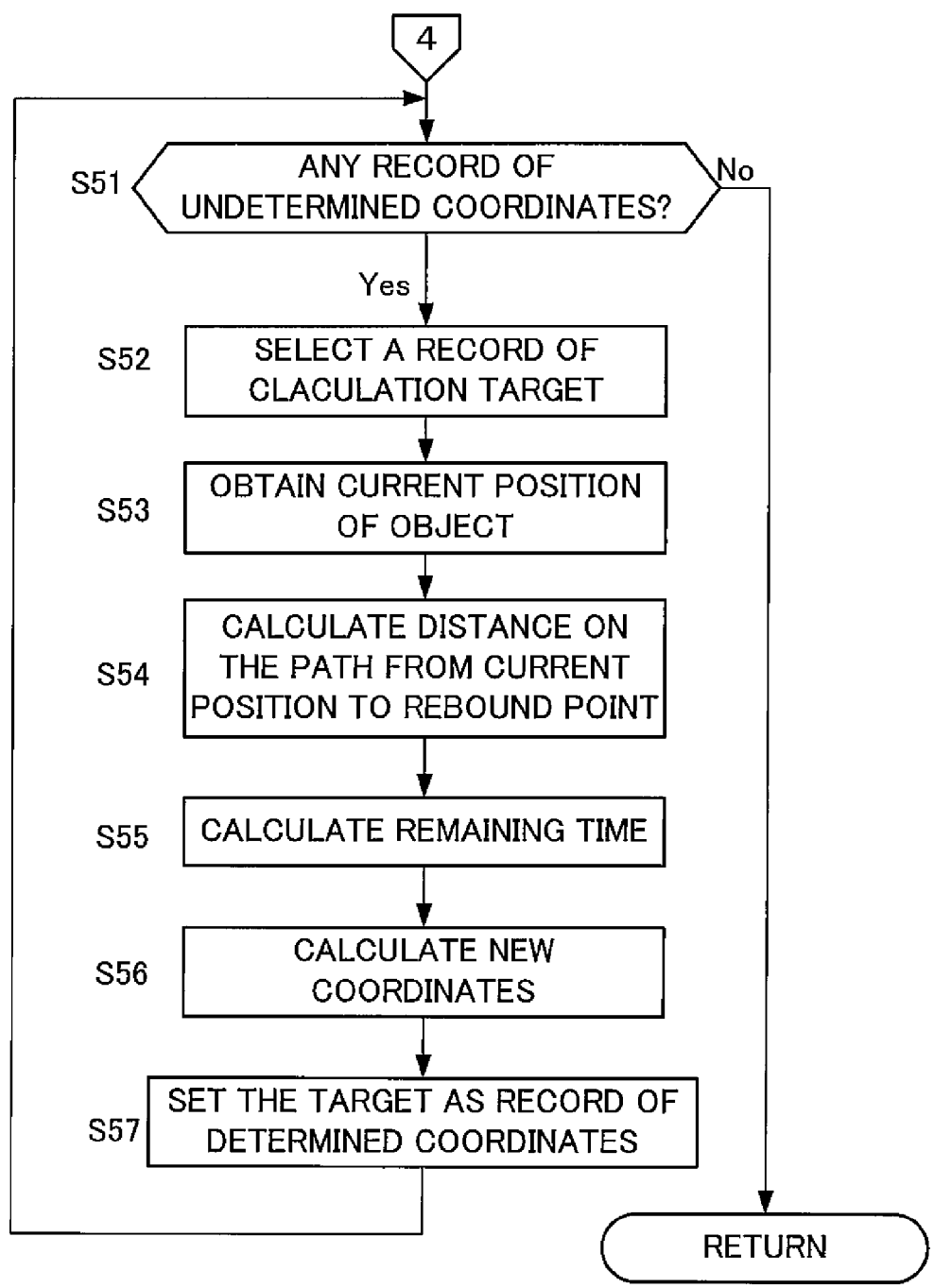
FIG. 11 is a flow chart following FIG. 10.

The present invention is not limited to the above-described embodiment, and an appropriate modification may be made thereto. For example, in the above embodiment, the increment of the travel distance of the operation indication marker caused by a delay in the detection of the operation time is eliminated by one-time processing, and thereafter, the operation indication marker is moved at the same speed as the original speed (the speed in the case of no delay). However, the correction of the increment of the travel distance may be gradually reduced though a plurality of times. That is, in the case of the example shown in FIG. 13, the travel direction of the object 60 may be changed at the point A into the direction along with the new path (the path connecting points A, C, and R1*b*), and the travel speed of the object 60 may be increased until the travel distance of the object 60 up to the rebound point R1*b* is equal to the travel distance up to the rebound point R1*b* in the case of making the object 60 move along the original path. An example of the processing for executing such processing will be described with reference to FIGS. 14 and 15. Incidentally, FIG. 14 illustrates the procedure of the correction processing executed instead of FIG. 11, and FIG. 15 illustrates the procedure of object coordinate calculation to be executed instead of FIG. 11.

Figure 14:
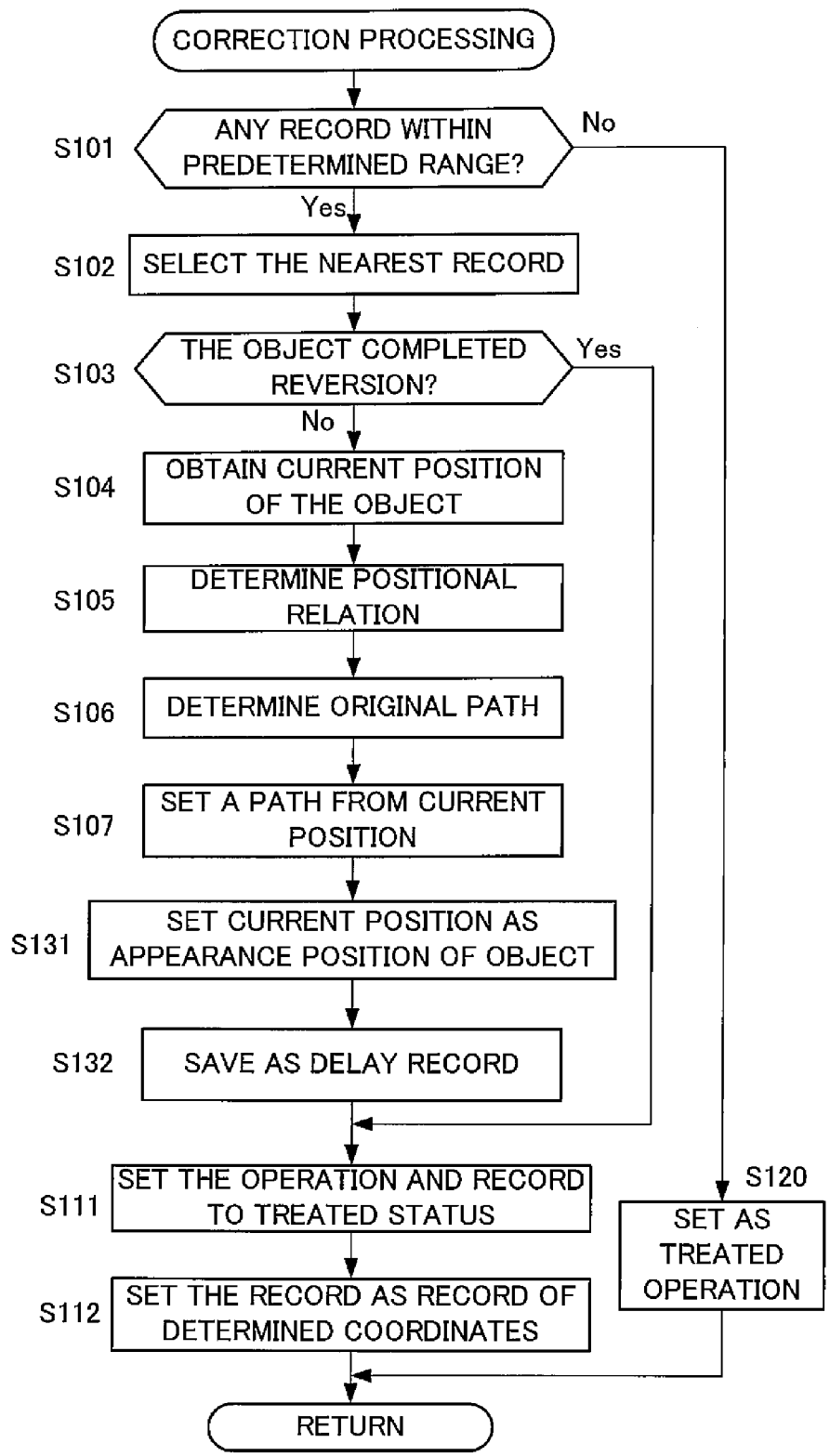
FIG. 14 is a flow chart illustrating a modification example of FIG. 12.

First, in the correction processing shown in FIG. 14, steps S131 and S132 are prepared instead of steps S108 to S110 of the correction processing of FIG. 12. The processing of the step denoted by the same reference numeral as FIG. 12 is the same as that of FIG. 12, and thus explanation thereof will be omitted. At step S131, the game control unit 11 sets the current position (the point A of FIG. 13) of the object 60 as the appearance position of the object 60 in the next frame. At next step S132, the game control unit 11 saves the subsequent record of the record selected as the comparison target at step S102 as a delay record. Thereafter, the game control unit 11 proceeds to step S111. That is, in the processing of FIG. 14, the appearance position of the object 60 in the next frame is set to, not the point B of FIG. 13, the point A that is the position of the object 60 at the moment when the operation time of the delay information is detected. Then, the record corresponding to the delay information is set as the delay record, and the object 60 corresponding to the delay record is temporarily accelerated by the processing of FIG. 15.

Figure 15:
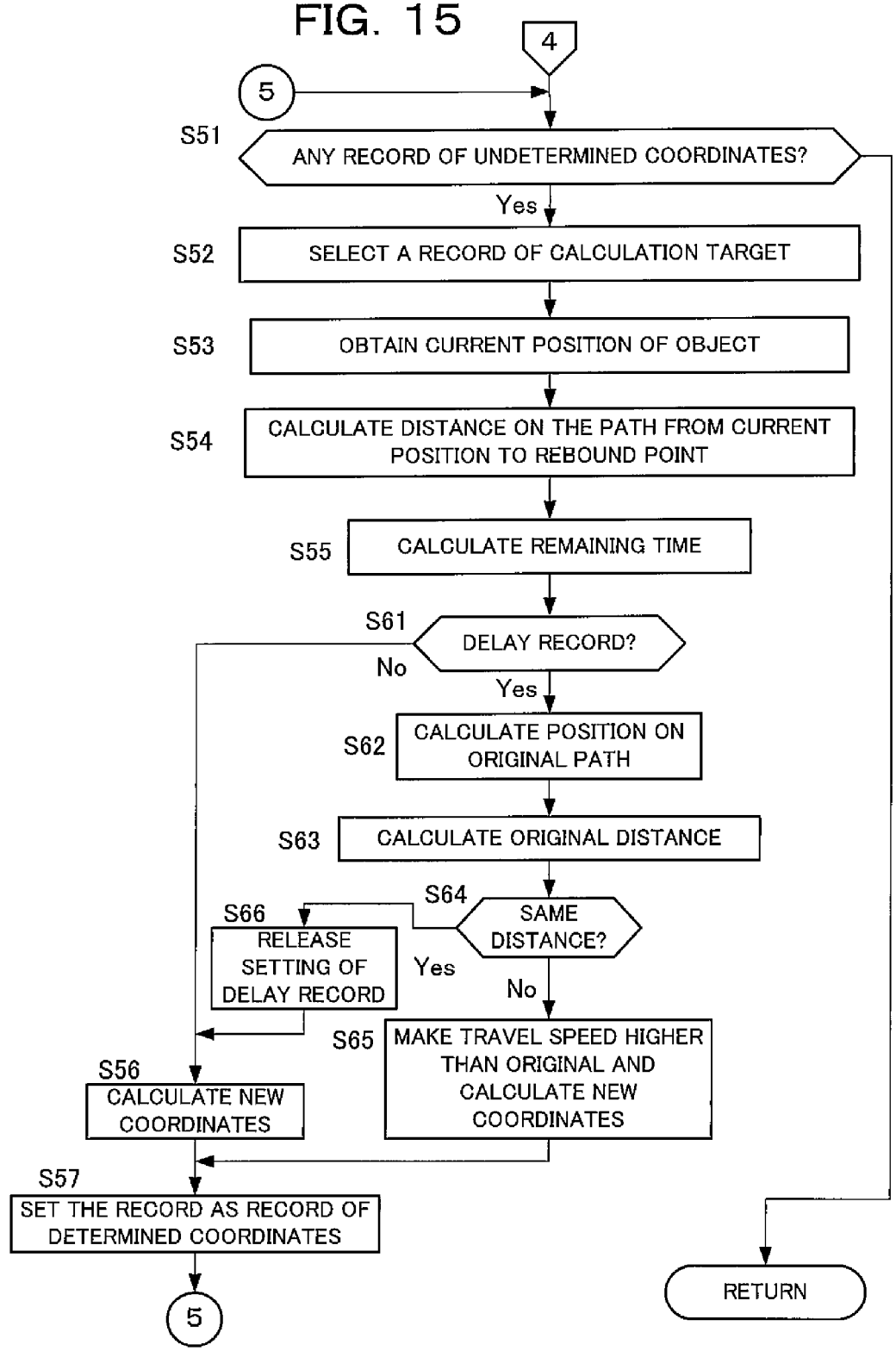
FIG. 15 is a flow chart illustrating a modification example of FIG. 11.

The processing of FIG. 15 is different from the processing of FIG. 11 in the following point: step S61 is added between step S55 and step S56; and steps S62 to S65 are added as processing in the case that a positive determination is made at step S61. The processing of the step denoted by the same reference numeral as FIG. 11 is the same as that of FIG. 11, and thus explanation thereof will be omitted. At step S61, the game control unit 11 determines whether the record selected as the calculation target is the delay record. When the record is not the delay record, the game control unit 11 proceeds to step S56. When it is determined at step S61 that the record is the delay record, the game control unit 11 proceeds to step S62. At step S62, the game control unit 11 calculates the position of the object 60 on the original path corresponding to the delay record. Herein, since the original path has been determined at step S106 of FIG. 14, the original travel speed of the object 60 is calculated by dividing the distance of the original path (the path connecting the points R2, C and R1*b* of FIG. 13) by the time from the display start time to the operation time, the display start time and the operation time being designated in the delay record. Then, which position on the original path the object 60 should be located at is determined based on the lapse time from the display start time to the current time and the travel speed calculated.

At step S63, the game control unit 11 calculates the distance along the original path from the original position calculated at step S62 to the rebound point R1*b* to be reached next. In addition, at next step S64, the game control unit 11 determines whether the distance along the original path calculated at step S63 is equal to the distance calculated at step S54. When the distance along the original path calculated at step S63 is not equal to the distance calculated at step S54, the game control unit 11 proceeds to step S65. At step S65, the game control unit 11 makes the travel speed of the object 60 higher than the original travel speed (the travel speed calculated at step S62), and calculates the position (new coordinates) of the object 60 on the current path (the path connecting the points A, C and R1b of FIG. 13) in the next frame. That is, as for the object 60 corresponding to the delay record, the new coordinates of the object 60 are calculated by moving the object 60 from the point A (the appearance position) at a higher speed than the original travel speed. By repeating such calculation, the increment of the travel distance of the object 60 caused by the delay of the operation information is gradually reduced. When the processing of step S65 is completed, the game control unit 11 proceeds to step S57.

In accordance with the acceleration by step S65, the distance difference which is compared at step S64 is gradually reduced. Then when the distances become coincident with each other and the determination at step S64 becomes positive, the game control unit 11 proceeds to step S66. At step S66, the game control unit 11 releases the setting of the delay record from the record of calculation target. Thereafter, the game control unit 11 proceeds to step S56. After the setting of the delay record is released, the object 60 moves at the original travel speed. Incidentally, the degree of acceleration in step S65 may be set to an appropriate rate depending on the situation. For example, the degree of the acceleration may be set to be two times of the original travel speed. As the difference in distance decreases, the travel speed of the object 60 may be gradually reduced toward the original travel speed. In the embodiment of FIGS. 14 and 15, the game control unit 11 functions as the correction unit by executing the subroutine of FIG. 14 and the processing of steps S61 to S66 of FIG. 15.

In the present invention, the selection of the travel path is not limited to the example where one path is selected from a plurality of prepared paths depending on the operation position. By analyzing the operations of the player in more detail, the travel path may be appropriately selected, and the rebound point and the travel path may be set in one-to-one correspondence with each other. Anyway, the present invention can be appropriately used as a solution for the case where, when a delay occurs in the detection of the operation time, if the operation indication marker is moved in a different direction from the position at the moment of detection, the travel speed increases because the travel distance of the next operation indication marker increases. The configuration of the operation portion is merely an example, and the operation portion is not necessarily disposed on the reference portion. As long as the correlation between the reference portion on the screen of the display device and the operation portion is clear, the operation may be located apart from the reference potion.

The above embodiment illustrates the example of suppressing the increase of the travel speed of the operation indication marker that is caused, especially, by the transmission delay of the operation information from the other game machine, that is, the other-side game machine. However, the present invention is also useful as a solution for the case where a delay occurs in the detection of the operation time in the own game machine because some trouble occurs between the input device and the control device within the own game machine.

The present invention is not limited to the game machine requiring an operation performed in accordance with music. The present invention can be appropriately applied to any game machine that indicates the operation time to a plurality of players by the movement of the operation indication marker and the reference portion, detects an operation of the player in response to the operation indication, and reciprocates the operation indication marker between the reference portions.

What is claimed is:

1. A game machine being applied to a game system progressing a game between a plurality of terminals connected through a communication line, and functioning as one of the plurality of terminals, the game machine including:
   an input device including at least one operation portion;
   a display device for displaying a game screen;
   a sequence data storage unit for storing sequence data that describes operation time of the operation portion of an own game machine during the game and operation time of the operation portion of another game machine functioning as another terminal of the game system;
   a game region presenting unit adapted and configured to display a game region, in which a reference portion corresponding to the operation portion of the own game machine and a reference portion corresponding to the operation portion of the another game machine are disposed to be spaced apart from each other by a predetermined distance, on the game screen;
   an own game machine operation detecting unit adapted and configured to detect an actual operation time to the operation portion of the own game machine and generate operation information having the actual operation time;
   an operation information transmitting unit adapted and configured to transmit the operation information generated by the own game machine operation detecting unit to the another game machine;
   an another game machine operation detecting unit adapted and configured to detect an actual operation time to the operation portion of the another game machine based on the operation information transmitted from an operation information transmitting unit of the another game machine; and
   a marker display control unit adapted and configured to move an operation indication marker indicating the operation time within the game region such that the operation indication marker arrives at the reference portion corresponding to the operation portion of the own game machine at the operation time of the operation portion of the own game machine described in the sequence data and arrives at the reference portion of the another game machine at the operation time of the operation portion of the another game machine, and plus, a travel path of the operation indication marker changes into a travel path headed to a next reference portion in response to the detection of the actual operation time by the own game machine operation detecting unit and the another game machine operation detecting unit, wherein
   the marker display control unit includes:
   a delay determining unit adapted and configured to determine whether or not a delay occurs in a moment when the actual operation time is detected by the another game machine operation detecting unit with respect to the actual operation time recorded in the operation information; and
   a correction unit adapted and configured to estimate a distance from the operation indication marker to the next reference portion as an original distance on the assumption that the delay has not occurred, when occurrence of the delay is determined, and correct display of the operation indication marker such that a difference between the original distance estimated and an actual distance from the operation indication marker to the next reference portion is eliminated earlier than the operation time on the sequence data corresponding to the next reference portion.

2. The game machine according to claim 1, wherein
the marker display control unit is adapted and configured to move the operation indication marker within the game region by gradually changing a position of the operation indication marker in accordance with a cycle for drawing the game screen, and
the correction unit is adapted and configured to change the position of the operation indication marker in a next cycle of drawing relatively to the position of the operation indication marker in one cycle of drawing such that the difference in distance is eliminated at one time.

3. The game machine according to claim 1, wherein
the correction unit is adapted and configured to eliminate the difference in distance, when it is determined that the delay occurs, by setting a new travel path from a position of the operation indication marker at a moment when the operation time is detected and starting to move the operation indication marker along the new travel path toward the next reference portion from a position on the new travel path, at which a distance to the next reference portion is equal to the original distance estimated.

4. The game machine according to claim 1, wherein
the marker display control unit is adapted and configured to move the operation indication marker within the game region by gradually changing a position of the operation indication marker in accordance with a cycle for drawing the game screen, and
the correction unit is adapted and configured to change the position of the operation indication marker in a next cycle of drawing relatively to the position of the operation indication marker in one cycle of drawing of the game screen such that the difference in distance is reduced gradually through a plurality of times of drawing the game screen.

5. The game machine according to claim 1, wherein
the correction unit is adapted and configured to eliminate the difference in distance, when it is determined that the delay occurs, by setting a new travel path from a position of the operation indication marker at a moment when the operation time is detected, repeatedly estimating the original distance while the operation indication marker moving, and increasing a travel speed of the operation indication marker with respect to an original travel speed, which is determined according to the original distance and remaining time until the operation time on the sequence data corresponding to the next reference portion, until a distance from the operation indication marker to the next reference portion on the new travel path is equal to the original distance.

6. The game machine according to claim 1, wherein
the marker display control unit is adapted and configured to change the travel path when the actual operation time is within a predetermined range with respect to the operation time described in the sequence data, and set a shortest path toward the next reference portion as the new path when a predetermined time has lapsed in a state where the actual operation time is not detected, and
the correction unit is adapted and configured to correct the display for eliminating the difference in distance at a moment only before the operation indication marker starts moving along the shortest path, and not to correct the display after the operation indication marker starts moving along the shortest path.

7. The game machine according to claim 1, wherein
the game region presenting unit is adapted and configured to display as the game region on the game screen of the display device, a region being formed in a quadrangle shape, in which two of the reference portions formed in a linear shape are set at both ends of the quadrangle respectively so as to face each other.

8. The game machine according to claim 1, wherein the input device includes a touch panel that is disposed in the display device to cover the game region.

9. The game machine according to claim 1, further including:
an audio output device for reproducing and outputting sounds;
a tune data storage for storing tune data for reproducing a tune; and
a tune reproducing unit which is adapted and configured to reproduce the tune from the audio output device based on the tune data, wherein
the sequence data describes the operation time of the operation portion during a reproduction of the tune.

10. A non-transitory computer-readable storage medium storing a computer program of a game machine, the game machine being applied to a game system progressing a game between a plurality of terminals connected through a communication line, functioning as one of the plurality of terminals, and including:
a computer;
an input device including at least one operation portion;
a display device for displaying a game screen; and
a sequence data storage unit for storing sequence data that describes operation time of the operation portion of an own game machine during the game and operation time of the operation portion of another game machine functioning as other terminal of the game system, the computer program, when executed by the computer, causing the computer to function as:
a game region presenting unit adapted and configured to display a game region, in which a reference portion corresponding to the operation portion of the own game machine and a reference portion corresponding to the operation portion of the another game machine are disposed to be spaced apart from each other by a predetermined distance, on the game screen;
an own game machine operation detecting unit adapted and configured to detect an actual operation time to the operation portion of the own game machine and generate operation information having the actual operation time;
an operation information transmitting unit adapted and configured to transmit the operation information generated the own game machine operation detecting unit to the another game machine;
an another game machine operation detecting unit adapted and configured to detect an actual operation time to the operation portion of the another game machine based on the operation information transmitted from an operation information transmitting unit of the another game machine; and
a marker display control unit adapted and configured to move an operation indication marker indicating the operation time within the game region such that the operation indication marker arrives at the reference portion corresponding to the operation portion of the own game machine at the operation time of the operation portion of the own game machine described in the sequence data and arrives at the reference portion of the another game machine at the operation time of the operation portion of the another game machine, and plus, a travel path of the operation indication marker changes into a travel path headed to a next reference portion in response to a detection of the actual operation time by the own game machine operation detecting unit and the another game machine operation detecting unit, wherein the marker display control unit further includes:

a delay determining unit adapted and configured to determine whether or not a delay occurs in a moment when the actual operation time is detected by the another game machine operation detecting unit with respect to the actual operation time recorded in the operation information; and a correction unit adapted and configured to estimate a distance from the operation indication marker to the next reference portion as an original distance on the assumption that the delay has not occurred, when occurrence of the delay is determined, and correct display of the operation indication marker such that a difference between the original distance estimated and an actual distance from the operation indication marker to the next reference portion is eliminated earlier than the operation time on the sequence data corresponding to the next reference portion.

11. A method for controlling a game machine which is applied to a game system progressing a game between a plurality of terminals connected through a communication line, and functions as one of the plurality of terminals, the game machine including:

an input device including at least one operation portion;

a display device for displaying a game screen; and a sequence data storage unit for storing sequence data that describes operation time of the operation portion of an own game machine during the game and operation time of the operation portion of another game machine functioning as other terminal of the game system, the method making a computer of the game machine execute the following steps:

a game region presenting step of displaying a game region, in which a reference portion corresponding to the operation portion of the own game machine and a reference portion corresponding to the operation portion of the another game machine are disposed to be spaced apart from each other by a predetermined distance, on the game screen;

an own game machine operation detecting step of detecting an actual operation time to the operation portion of the own game machine and generating operation information having the actual operation time;

an operation information transmitting step of transmitting the operation information generated by the own game machine operation detecting step to the another game machine;

an another game machine operation detecting step for detecting an actual operation time to the operation portion of the another game machine based on the operation information transmitted by an operation information transmitting step of the another game machine; and a marker display control step of moving an operation indication marker indicating the operation time within the game region such that the operation indication marker arrives at the reference portion corresponding to the operation portion of the own game machine at the operation time of the operation portion of the own game machine described in the sequence data and arrives at the reference portion of the another game machine at the operation time of the operation portion of the another game machine, and plus, a travel path of the operation indication marker changes into a travel path headed to a next reference portion in response to a detection of the actual operation time by the own game machine operation detecting step and the another game machine operation detecting step, wherein the marker display control step further includes:

a delay determining step of determining whether or not a delay occurs in a moment when the actual operation time is detected by the another game machine operation detecting step with respect to the actual operation time recorded in the operation information; and a correction step of estimating a distance from the operation indication marker to the next reference portion as an original distance on the assumption that the delay has not occurred, when occurrence of the delay is determined, and correcting display of the operation indication marker such that a difference between the original distance estimated and an actual distance from the operation indication marker to the next reference portion is eliminated earlier than the operation time on the sequence data corresponding to the next reference portion.

* * * * *